United States Patent
Ochi et al.

(10) Patent No.: US 7,984,305 B2
(45) Date of Patent: Jul. 19, 2011

(54) ENCRYPTION PROCESSING APPARATUS AND ENCRYPTION PROCESSING METHOD FOR SETTING A MIXED ENCRYPTION PROCESSING SEQUENCE

(75) Inventors: Ryo Ochi, Kanagawa (JP); Susumu Kusakabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1171 days.

(21) Appl. No.: 10/749,412

(22) Filed: Jan. 2, 2004

(65) Prior Publication Data

US 2004/0193898 A1 Sep. 30, 2004

(30) Foreign Application Priority Data

Jan. 8, 2003 (JP) ................................. 2003-001647

(51) Int. Cl.
*G06F 11/30* (2006.01)
(52) U.S. Cl. ........ 713/189; 713/193; 713/190; 713/191; 713/300; 713/330; 380/28; 380/29; 380/30; 380/37; 380/45; 380/46; 380/281; 380/277; 380/259; 726/26
(58) Field of Classification Search .............. 380/28–30, 380/37, 45–46, 281, 277, 259; 713/193, 713/189–191, 300, 330; 726/26
See application file for complete search history.

(56) References Cited

U.S. PATENT DOCUMENTS

| | | | | |
|---|---|---|---|---|
| 6,658,569 | B1 * | 12/2003 | Patarin et al. | 713/194 |
| 6,839,847 | B1 * | 1/2005 | Ohki et al. | 713/194 |
| 6,937,727 | B2 * | 8/2005 | Yup et al. | 380/37 |
| 6,970,561 | B1 * | 11/2005 | Obana | 380/28 |
| 7,043,016 | B2 * | 5/2006 | Roelse | 380/29 |
| 7,194,090 | B2 * | 3/2007 | Muratani et al. | 380/29 |
| 2001/0053220 | A1 * | 12/2001 | Kocher et al. | 380/29 |
| 2002/0124179 | A1 * | 9/2002 | Kaminaga et al. | 713/194 |
| 2003/0002664 | A1 * | 1/2003 | Anand | 380/37 |
| 2003/0048903 | A1 * | 3/2003 | Ito et al. | 380/263 |
| 2004/0047466 | A1 * | 3/2004 | Feldman et al. | 380/37 |

FOREIGN PATENT DOCUMENTS

GB 2345229 A * 6/2000

OTHER PUBLICATIONS

Henry Kuo and Ingrid Verbauwhede, "Architectural Optimization for a 1.82Gbits/sec VLSI Implementation of the AES Rijndael Algorithm", Springer-Verlag, LNCS 2162, pp. 51-64, 2001.*
Bruce Schneier, "Applied Cryptography", second edition, published by John Wiley & Son, Inc, pp. 265-278, pp. 357-363, 1996.*

* cited by examiner

*Primary Examiner* — Edan Orgad
*Assistant Examiner* — Canh Le
(74) *Attorney, Agent, or Firm* — Oblon, Spivak, McClelland, Maier & Neustadt, L.L.P.

(57) ABSTRACT

An encryption processing apparatus and method in which the difficulty of encryption analysis based on power analysis can be increased considerably are provided. By dividing an original encryption processing sequence into a plurality of groups and by mixing the processing sequence by setting dummies as necessary, several hundreds to several thousands of types of different mixed encryption processing sequences can be set, and a sequence selected from a large number of these settable sequences is performed. According to this configuration, consumption power variations which are completely different from consumption power variations caused by a regular process possessed by the original encryption processing sequence can be generated, and thus the difficulty of encryption analysis based on power analysis can be increased considerably.

17 Claims, 14 Drawing Sheets

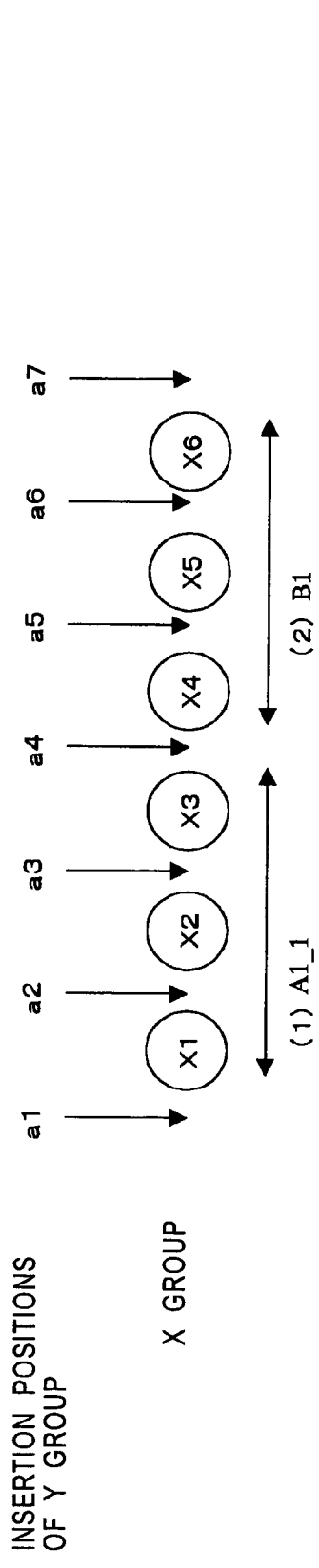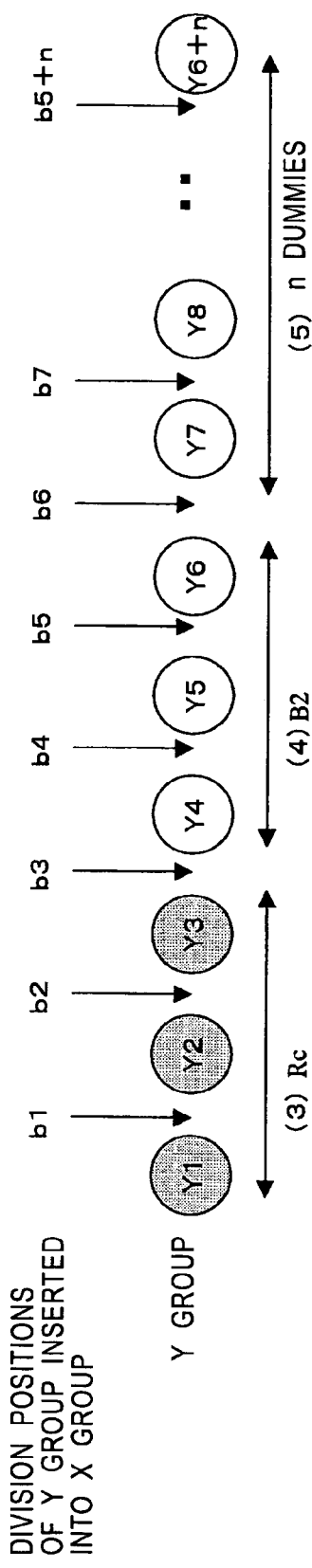

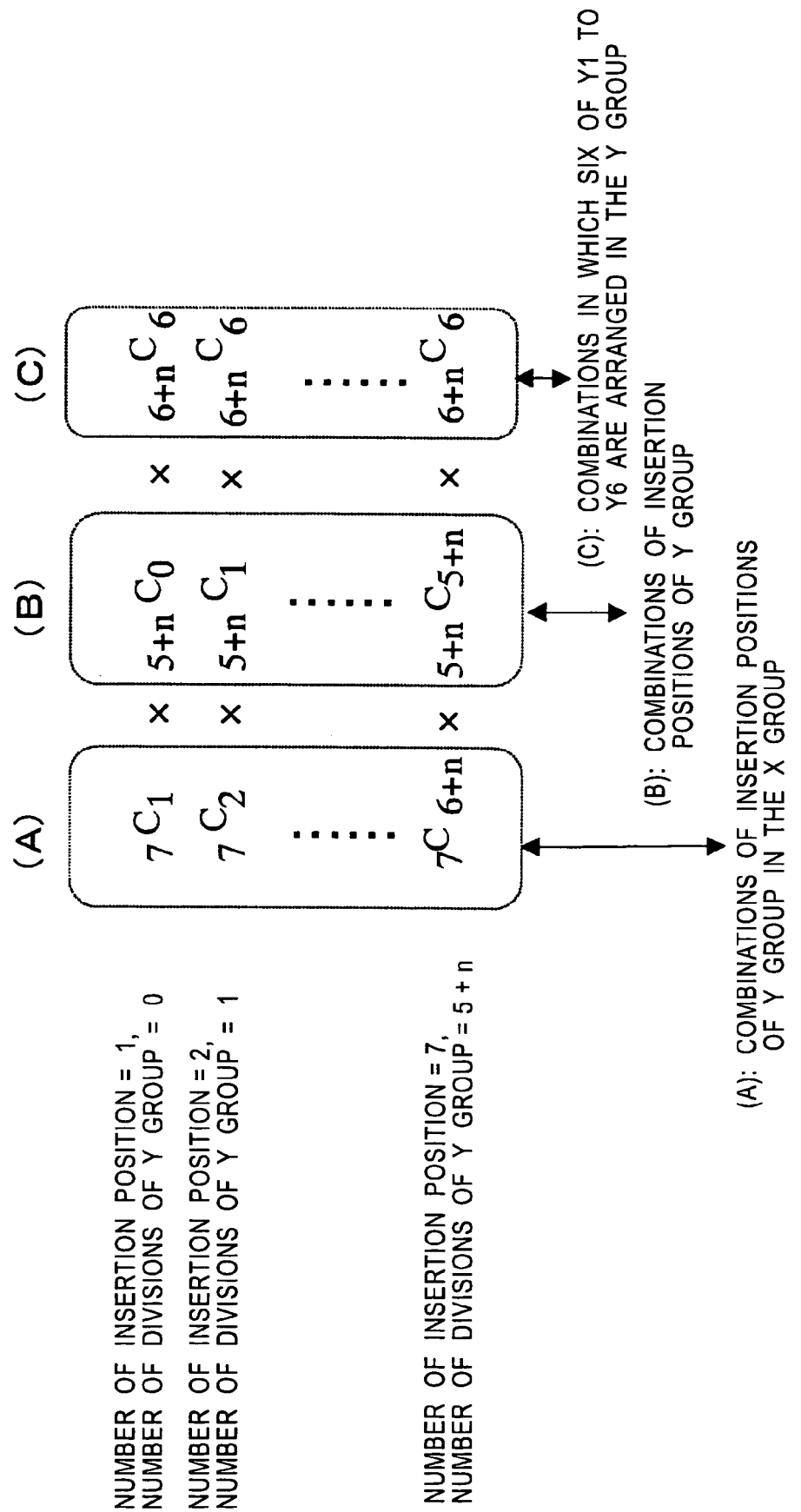

FIG. 10A

NUMBER OF DUMMIES:
n = 0

$$\begin{aligned}
{}_7C_1 \times {}_5C_0 \times 1 &= 7 \times 1 \times 1 = 7 \\
{}_7C_2 \times {}_5C_1 \times 1 &= 21 \times 5 \times 1 = 105 \\
{}_7C_3 \times {}_5C_2 \times 1 &= 35 \times 10 \times 1 = 350 \\
{}_7C_4 \times {}_5C_3 \times 1 &= 35 \times 10 \times 1 = 350 \\
{}_7C_5 \times {}_5C_4 \times 1 &= 21 \times 5 \times 1 = 105 \\
{}_7C_6 \times {}_5C_5 \times 1 &= 7 \times 1 \times 1 = 7
\end{aligned}$$

→ 942 KINDS

FIG. 10B

NUMBER OF DUMMIES:
n = 3

$$\begin{aligned}
{}_7C_1 \times {}_8C_0 \times {}_9C_6 &= 7 \times 1 \times 84 = 588 \\
{}_7C_2 \times {}_8C_1 \times {}_9C_6 &= 21 \times 8 \times 84 = 14112 \\
{}_7C_3 \times {}_8C_2 \times {}_9C_6 &= 35 \times 28 \times 84 = 82320 \\
{}_7C_4 \times {}_8C_3 \times {}_9C_6 &= 35 \times 56 \times 84 = 164640 \\
{}_7C_5 \times {}_8C_4 \times {}_9C_6 &= 21 \times 70 \times 84 = 123480 \\
{}_7C_6 \times {}_8C_5 \times {}_9C_6 &= 7 \times 56 \times 84 = 32928 \\
{}_7C_7 \times {}_8C_6 \times {}_9C_6 &= 1 \times 28 \times 84 = 2352
\end{aligned}$$

→ 420420 KINDS

ENCRYPTION PROCESSING APPARATUS AND ENCRYPTION PROCESSING METHOD FOR SETTING A MIXED ENCRYPTION PROCESSING SEQUENCE

BACKGROUND OF THE INVENTION

1. Field of the Invention

The present invention relates to an encryption processing apparatus, an encryption processing method, and a computer program. More particularly, the present invention relates to an encryption processing apparatus and method for realizing an encryption process having high resistance to encryption processing analysis based on power analysis in a computation circuit of, for example, an IC module for performing an encryption process, and to a computer program therefor.

2. Description of the Related Art

Recently, along with the development of network communication and electronic business transactions, insurance of security communication has become an important issue. One of methods of ensuring security is encryption technology, and at present, communications using various encryption techniques have been performed in practice.

For example, a system is implemented in which an encryption processing module is incorporated in a compact device such as an IC card, and data transmission and reception is performed between the IC card and a reader/writer serving as a data reading/writing device, so that an authentication process is performed, or the transmission and reception data is encrypted and decrypted.

In the encryption processing module, for example, a data encryption process for inputting plain text and outputting encrypted text, or a decryption process for inputting encrypted text and outputting plain text is performed. These encryption processes include electrical processes by hardware which forms an encryption processing module, for example, semiconductors. Therefore, there is a risk in that, by analyzing power consumption when an encryption process is performed in such a semiconductor module, the encryption processing procedure is analyzed.

Examples of attacks on a computation processing device such as an IC, that is, cryptanalysis attacks, include timing attack (TA) for estimating secret information by analyzing the processing time; simple power analysis (SPA) for estimating secret information by observing consumption power during an encryption process; and differential power analysis (DPA) for estimating secret information by measuring consumption power during an encryption process on a large amount of data and by statistically analyzing the measured data.

Several technologies for increasing the resistance to power analysis have already been proposed. For example, in Japanese Unexamined Patent Application Publication No. 2000-305453, a configuration is disclosed in which intermediate data control means is provided, intermediate data generated in the encryption process is changed by random numbers, and consumption power is controlled by random numbers, making an analysis difficult based on consumption power. Furthermore, Japanese Unexamined Patent Application Publication Nos. 2001-256116 and 2001-256713 disclose, as a configuration for preventing analysis using electrical-current detection of a bus which forms an encryption process circuit, a configuration in which analysis is made difficult by adding a configuration in which the number of bytes of data which is transferred through the bus is controlled.

In addition, in Japanese Unexamined Patent Application Publication No. 2002-526797, a configuration is disclosed in which analysis using consumption power is made difficult by causing a computation process within an encryption processing module and data transfer among registers to be performed in parallel with respect to time. In Japanese Unexamined Patent Application Publication No. 2002-526849, a configuration is disclosed in which analysis is made difficult by performing a process for writing a value generated on the basis of a random number when the process for writing data to the memory is performed.

In the manner described above, various technologies aimed at improving the resistance to power analysis have been proposed. However, in a configuration in which power control based on a random number for the intermediate data is performed, when it is determined at which position in the encryption processing sequence power control based on the random number is performed, there is a risk in that power analysis at a real encryption processing sequence execution position other than that position becomes possible. Also, in a configuration in which power analysis by parallel processing is made difficult, there is a risk in that, if parallel processing is performed at a specific step in the encryption processing sequence, power analysis becomes possible if the processing position of the parallel processing is found.

SUMMARY OF THE INVENTION

The present invention is made in view of the above-described problems. An object of the present invention is to provide an encryption processing apparatus and an encryption processing method, in which setting of several hundreds to several thousands of types of different encryption processing sequences is possible in a configuration in which an original encryption processing sequence is performed by being mixed, and a sequence selected from a large number of these settable sequences is performed, causing consumption power variations to be generated which are completely different from consumption power variations caused by a regular process possessed by the original encryption processing sequence, and thus the difficulty of encryption analysis based on power analysis can be increased, and to provide a computer program therefor.

To achieve the above-mentioned object, in one aspect, the present invention provides an encryption processing apparatus for performing a data encryption process, the encryption processing apparatus including: a control section for setting a mixed encryption processing sequence by dividing an original encryption processing sequence into a plurality of groups composed of one or more encryption processing units and by mixing processing sequences of encryption processing units under the condition in which the processing sequence of the encryption processing units within each set group is fixed; and an encryption processing section for performing an encryption process in accordance with the mixed encryption processing sequence set by the control section.

In one form of the encryption processing apparatus of the present invention, preferably, the control section sets a dummy encryption processing unit for performing a dummy encryption process unnecessary for the original encryption processing sequence in at least one of the groups of divisions, and sets one mixed encryption processing sequence by mixing the encryption processing units of a plurality of groups containing the dummy encryption processing unit.

In one form of the encryption processing apparatus of the present invention, preferably, the control section determines a group of sequences, which can be performed independently of each other, within the original encryption processing sequence to be divided in a process of division into a plurality of groups composed of one or more encryption processing units, and performs a process for setting a group of divisions in which the sequence which can be performed independently is a unit.

In one form of the encryption processing apparatus of the present invention, preferably, the encryption processing unit is a single-DES encryption process, and the control section sets one mixed encryption processing sequence by dividing the original encryption processing sequence containing one or more single-DES encryption processes into a plurality of groups composed of one or more single-DES encryption processes and by mixing the single-DES encryption processing units contained in each group of divisions by mutual replacement of the single-DES encryption processing unit of each set group under the condition in which the processing sequence within each set group is fixed.

In one form of the encryption processing apparatus of the present invention, preferably, the original encryption processing sequence to be mixed is an encryption processing sequence including a triple-DES encryption process, and the control section performs a process for dividing the encryption processing sequence into a plurality of groups composed of one or more encryption processing units by using the single-DES encryption process which forms the triple-DES encryption process as an encryption processing unit.

In one form of the encryption processing apparatus of the present invention, preferably, the original encryption processing sequence to be mixed is an encryption processing sequence including a triple-DES encryption process and a random-number generation process, and the control section forms a random-number generation process as a process including a conversion process by three single-DES processes, and sets the triple-DES encryption process as a random-number generation process in one of the groups of divisions.

In one form of the encryption processing apparatus of the present invention, preferably, the original encryption processing sequence to be mixed is an encryption processing sequence including a triple-DES encryption process, and the control section performs a process for dividing the encryption processing sequence into a plurality of groups composed of one or more encryption processing units by using the single-DES encryption process which forms the triple-DES encryption process as an encryption processing unit, sets a dummy single-DES process as a dummy encryption process unnecessary for the original encryption processing sequence in at least one of the groups of divisions, and sets the number of single-DES processes of dummies to be set to a multiple of 3 corresponding to the triple DES.

In one form of the encryption processing apparatus of the present invention, preferably, the encryption processing apparatus has a memory for storing processing results of the encryption processing units which form the mixed encryption processing sequence set by the control section, and the control section stores the processing results in the memory in such a manner as to be capable of identifying which encryption processing unit the processing results are obtained from.

In a second aspect, the present invention provides an encryption processing apparatus including: a control section for setting a mixed encryption processing sequence by dividing the original encryption processing sequence into one or more encryption processing units, by adding a dummy encryption processing unit for performing a process corresponding to the encryption processing unit, and by performing a mixing of processing sequences of the original encryption processing units included in the original encryption processing sequence and the dummy encryption processing units; and an encryption processing section for performing an encryption process in accordance with the mixed encryption processing sequence set by the control section.

In one form of the encryption processing apparatus of the present invention, preferably, the encryption processing unit contained in the original encryption processing sequence is a single-DES encryption process, and the control section sets the dummy encryption processing unit as a single-DES encryption process.

In a third aspect, the present invention provides an encryption processing method for performing a data encryption process, the encryption processing method including: a division step of dividing an original encryption processing sequence into a plurality of groups composed of one or more encryption processing units; a mixed encryption processing sequence setting step of setting a mixed encryption processing sequence by mixing processing sequences of encryption processing units under the condition in which the processing sequence of the encryption processing units, set in the division step, within each group, is fixed; and an encryption processing step of performing an encryption process in accordance with the mixed encryption processing sequence set in the mixed encryption processing sequence setting step.

In one form of the encryption processing method of the present invention, the encryption processing method may further include the step of setting a dummy encryption processing unit for performing a dummy encryption process unnecessary for the original encryption processing sequence in at least one of the groups of divisions, and preferably, the mixed encryption processing sequence setting step sets one mixed encryption processing sequence by mixing the encryption processing units of a plurality of groups containing the dummy encryption processing units.

In one form of the encryption processing method of the present invention, preferably, the division step determines a group of sequences, which can be performed independently of each other, within the original encryption processing sequence to be divided in a process of division into a plurality of groups composed of one or more encryption processing units, and performs a process for setting a group of divisions in which the sequence which can be performed independently is a unit.

In one form of the encryption processing method of the present invention, preferably, the encryption processing unit is a single-DES encryption process, the division step divides the original encryption processing sequence containing one or more single-DES encryption processes into a plurality of groups composed of one or more single-DES encryption processes, and the mixed encryption processing sequence setting step sets one mixed encryption processing sequence by mixing the single-DES encryption processing units contained in each group of divisions by mutual replacement of the single-DES encryption processing units of each set group under the condition in which the processing sequence within each set group is fixed.

In one form of the encryption processing method of the present invention, preferably, the original encryption processing sequence to be mixed is an encryption processing sequence including a triple-DES encryption process, and the division step performs a process for dividing the encryption processing sequence into a plurality of groups composed of one or more encryption processing units by using the single-DES encryption process which forms the triple-DES encryption process as an encryption processing unit.

In one form of the encryption processing method of the present invention, preferably, the original encryption processing sequence to be mixed is an encryption processing sequence including a triple-DES encryption process and a random-number generation process, and the encryption processing method may further include the steps of forming a random-number generation process as a process including a conversion process by three single-DES processes and setting the triple-DES encryption process as a random-number generation process in one of the groups of divisions.

In one form of the encryption processing method of the present invention, preferably, the original encryption processing sequence to be mixed is an encryption processing sequence including a triple-DES encryption process, the division step divides the encryption processing sequence into a plurality of groups composed of one or more encryption processing units by using the single-DES encryption process which forms the triple-DES encryption process as an encryption processing unit, and the mixed encryption processing sequence setting step includes a process for setting a dummy single-DES process as a dummy encryption process unnecessary for the original encryption processing sequence in at least one of the groups of divisions, and for setting the number of single-DES processes of dummies to be set to a multiple of 3 corresponding to the triple DES.

In one form of the encryption processing method of the present invention, preferably, the encryption processing step includes a step of storing processing results in a memory for storing processing results of the encryption processing units which form the mixed encryption processing sequence in such a manner as to be capable of identifying which encryption processing unit the processing results are obtained from.

In a fourth aspect, the present invention provides an encryption processing method for performing a data encryption process, the encryption processing method including: a division step of dividing an original encryption processing sequence into one or more encryption processing units; a mixed encryption processing sequence setting step of setting a mixed encryption processing sequence by adding a dummy encryption processing unit for performing a process corresponding to the encryption processing unit and by mixing processing sequences of the original encryption processing units included in the original encryption processing sequence and the dummy encryption processing units; and an encryption processing step of performing an encryption process in accordance with the mixed encryption processing sequence.

In one form of the encryption processing method of the present invention, preferably, the encryption processing unit contained in the original encryption processing sequence is a single-DES encryption process, and the mixed encryption processing sequence setting step sets the dummy encryption processing unit as a single-DES encryption process.

In a fifth aspect, the present invention provides a computer program written to perform encryption processing on a computer system, the computer program including: a division step of dividing an original encryption processing sequence into a plurality of groups composed of one or more encryption processing units; a mixed encryption processing sequence setting step of setting a mixed encryption processing sequence by mixing processing sequences of encryption processing units under the condition in which the processing sequence of the encryption processing units, set in the division step, within each group, is fixed; and an encryption processing step of performing an encryption process in accordance with the mixed encryption processing sequence set in the mixed encryption processing sequence setting step.

In a sixth aspect, the present invention provides a computer program written to perform encryption processing on a computer system, the computer program including: a division step of dividing an original encryption processing sequence into one or more encryption processing units; a mixed encryption processing sequence setting step of setting a mixed encryption processing sequence by adding a dummy encryption processing unit for performing a process corresponding to the encryption processing unit and by mixing processing sequences of the original encryption processing units included in the original encryption processing sequence and the dummy encryption processing units; and an encryption processing step of performing an encryption process in accordance with the mixed encryption processing sequence.

According to the configuration of the present invention, by dividing an original encryption processing sequence into a plurality of groups and by setting dummies, several hundreds to several thousands of types of different encryption processing sequences can be set, and a sequence selected from a large number of these settable sequences is performed. Therefore, it becomes possible to cause consumption power variations which are completely different from consumption power variations caused by a regular process possessed by the original encryption processing sequence to be generated each time the selected mixed encryption processing sequence is performed, and thus the difficulty of encryption analysis based on power analysis can be increased considerably.

Furthermore, according to the configuration of the present invention, when an original encryption processing sequence is divided into a plurality of groups composed of one or more encryption processing units, a sequence group which can be executed independently among the original encryption processing sequences to be divided is discriminated, a process for setting a group of divisions in which the sequence which can be executed independently is a unit is performed, and the processing sequences of the encryption processing units are mixed under the condition in which the processing sequence of the encryption processing units within each setting group is fixed. Therefore, even when the mixed encryption processing sequence is performed, necessary processing results can be reliably obtained.

In addition, according to the configuration of the present invention, regarding a random-number generation process or dummies to be set, for example, when an original encryption process is an algorithm based on a triple-DES, random-number generation and conversion processes are performed by a triple-DES process, and the dummies are set by a single-DES corresponding to a multiple of 3. Therefore, with regard to all the processes, the discrimination from the original triple-DES becomes difficult, and thus the difficulty of power analysis can be increased.

The computer program of the present invention is a computer program which can be provided to a general-purpose computer system capable of executing, for example, various program codes, such computer program being provided by means of a storage medium and a communication medium, which are provided in a computer-readable format, for example, a storage medium, such as a CD, an FD, and an MO, and a communication medium such as a network.

In this specification, the system designates a logical assembly of a plurality of devices. It is not essential that the devices be disposed in the same housing.

BRIEF DESCRIPTION OF THE DRAWINGS

FIGS. 8A, 8B, and 8C illustrate setting of a group of divisions and setting of mixed encryption processing sequences in the encryption process of the present invention;

FIG. 9 illustrates calculations of the number of modes of setting of the mixed encryption processing sequences in the encryption process of the present invention;

FIGS. 10A and 10B illustrate specific examples of the number of modes of setting of the mixed encryption processing sequences in the encryption process of the present invention;

DESCRIPTION OF THE PREFERRED EMBODIMENTS

A description will now be given of an encryption processing apparatus, an encryption processing method, and a computer program of the present invention with reference to the drawings.

There are various encryption processing algorithms. These can be broadly classified into a public key encryption method in which an encryption key and a decryption key are set as different keys, for example, as a public key and a secret key, and a common key encryption method in which an encryption key and a decryption key are set as a common key.

One of the common key encryption methods is a method in which a plurality of keys are generated by using a common key as a base, and an encryption process is repeatedly performed using the plurality of the generated keys. A representative algorithm in which such a key generation method is applied is a common key block encryption method.

The algorithm of the common key block encryption can be mainly classified into a round function section for converting input data and a key schedule section for generating a key used in each round of the round function section. The key (sub-key) used in each round of the round function section is input to the key schedule section and generated on the basis of one main key, and is used in each round function section. A representative example of this common key encryption method includes DES (Data Encryption Standard) as the United States Federation standard encryption method.

Figure 1:
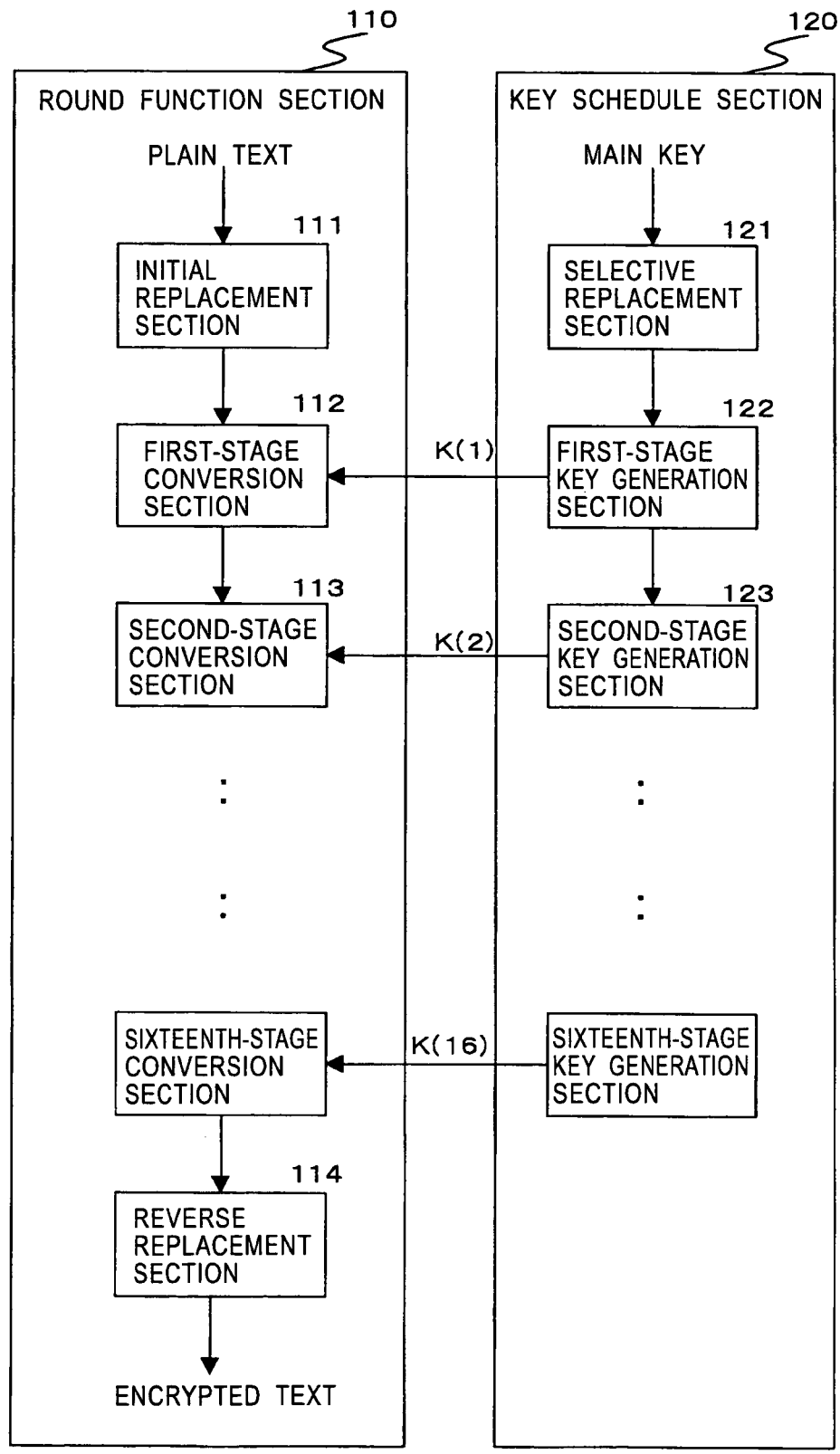
FIG. 1 illustrates a DES encryption processing algorithm.

The basic structure of the DES encryption process will now be described with reference to the drawings. The DES encryption process has a structure in which plain text is converted into encrypted text by a simple repetition of a conversion function. FIG. 1 shows the basic structure of the DES encryption process. The DES encryption processing algorithm is formed of a round function section 110 for converting input data, and a key schedule section 120 for generating a key used in each round of the round function section.

In the round function section 110, initially, plain text (64 bits) is divided into 32 bits for each of L and R in an initial replacement section 111, the divided 32 bits for L and R are input to a first-stage conversion section 112, whereby a conversion process is performed based on the key K(1) input from a first-stage key generation section 122 of the key schedule section 120. The results of the conversion process are input to a second-stage conversion section 113 of the next stage.

In the key schedule section 120, initially, an 8-bit parity of the input main key (64 bits) is removed by a selective replacement section 121, a replacement process for the remaining 56 bits is performed, and these are input to the first-stage key generation section 122. In the first-stage key generation section 122, a process for shifting an input bit sequence and a parity-bit removing process are performed, a sub-key K(1) of 48 bits is generated, and the generated sub-key K(1) is output to the first-stage conversion section 112 of the round function section 110. In the first-stage key generation section 122, a high-order bit sequence (28 bits) and a low-order bit sequence (28 bits) by the shifting process are output to a second-stage key generation section 123 of the lower stage.

The round function section has conversion sections of 16 stages. Each conversion section performs a conversion process in which the key input from the key schedule section 120 is applied by using the output of the conversion section of the previous stage, and outputs the conversion results to the conversion section of the subsequent stage. The outputs converted by the conversion sections of 16 stages are input to a reverse replacement section 114, whereby a reverse replacement process of the initial replacement section 111 is performed, and the text is output as encrypted text.

Figure 2:
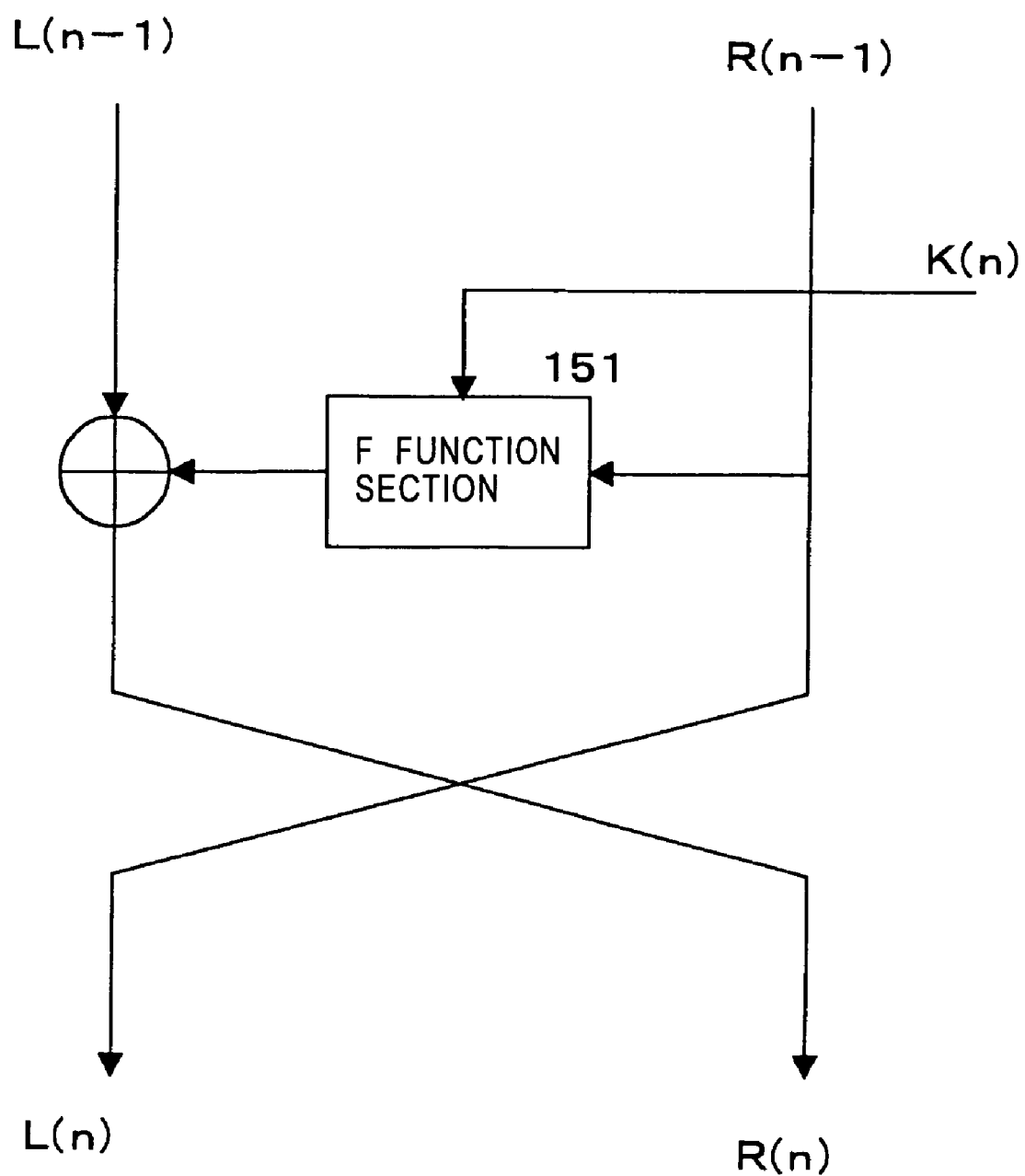
FIG. 2 illustrates the structure of a round function section in the DES encryption processing algorithm.

The structure of the conversion section which forms each round of the round function section 110 is shown in FIG. 2. As shown in FIG. 2, the conversion section inputs two inputs, that is, $L(n-1)$ and $R(n-1)$ of the previous stage ((n−1)-th stage), and inputs a key (k(n)) from the key schedule section. In the F function section 151, by using the key (k(n)) input from the key schedule section, a process for converting a bit sequence $(R(n-1))$ input from the conversion section of the previous stage is performed, and an exclusive OR of the conversion result and the remaining bit sequence $(L(n-1))$ input from the previous stage conversion section is executed, generating the output $R(n)$ of the conversion section of the next stage. A bit sequence in which $R(n-1)$ is $L(n)$, and $R(n)$ generated by the above-described F function and exclusive OR computation are input to the conversion section of the next stage, and similar processing is repeated.

Figure 3:
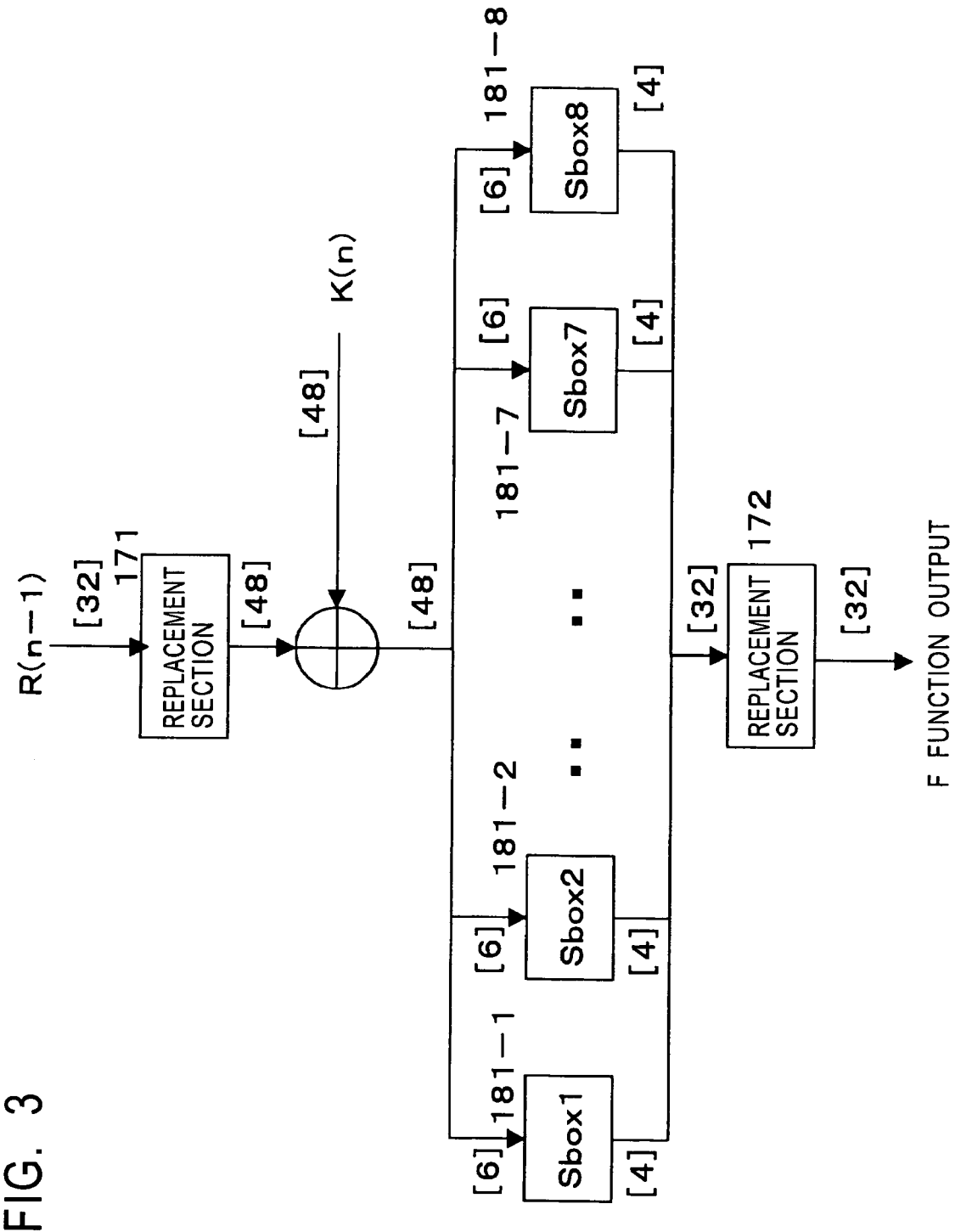
FIG. 3 illustrates the structure of an S box within the round function section in the DES encryption processing algorithm.

The structure of the F function is shown in FIG. 3. The F function has a plurality of S boxes for performing non-linear processes. The input value $R(n-1)$ from the previous stage of the round function section is expanded to 48 bits by a replacement section 171, furthermore, an exclusive OR with the key (48 bits) input from the key schedule section is executed, and the output is input, in units of 6 bits, to a plurality of S boxes 181-1 to 181-8 for performing a non-linear conversion process. In each S box, for example, a non-linear conversion process for conversion from 6 bits into 4 bits using a conversion table is performed.

The output bits 4×8=32 bits from the S box 181-1 to 181-8 are input to the replacement section 172, whereby a process for replacing the bit position is performed, and the F function output of 32 bits is generated and output.

As described with reference to FIGS. 1 to 3, a DES encryption process is performed by a conversion process of a plurality of stages (16 stages). A configuration in which this DES encryption process is performed a plurality of times in order to increase the encryption strength, for example, triple-DES encryption processing for performing three DES encryption processes, is often adopted in various fields including, for example; a mutual authentication process among data communication devices via the Internet and an encryption process used in a mutual authentication process between an IC card and a reader/writer. In order to make a distinction from the triple-DES encryption process, one DES encryption process is referred to as a single-DES encryption process.

Figure 4:
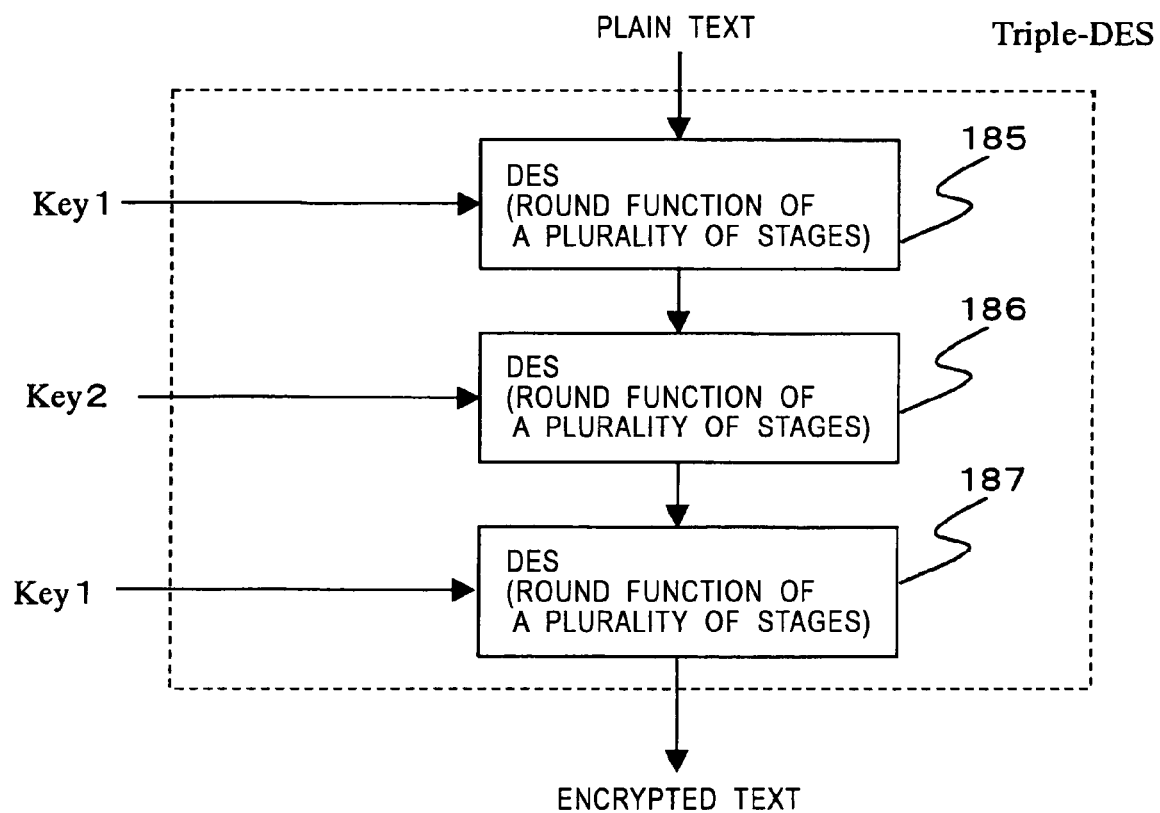
FIG. 4 illustrates triple-DES encryption processing.

In the triple-DES encryption process structure, as shown in FIG. 4, encrypted text is created from plain text by repeatedly performing the DES encryption process described with reference to FIGS. 1 to 3. Each of single-DES encryption processing sections 185, 186, and 187 has the above-described round function section of 16 stages, and repeats a process using the F function having an S box for 16 times.

Usually, in the triple-DES encryption process, the same main key (K1) is used in the initial single-DES encryption processing section 185 and the last DES encryption processing section 187, and a different main key (K2) is used in the intermediate DES encryption processing section 186. In this manner, by repeatedly performing the DES encryption process a plurality of times, the encryption strength can be increased.

Figure 5:
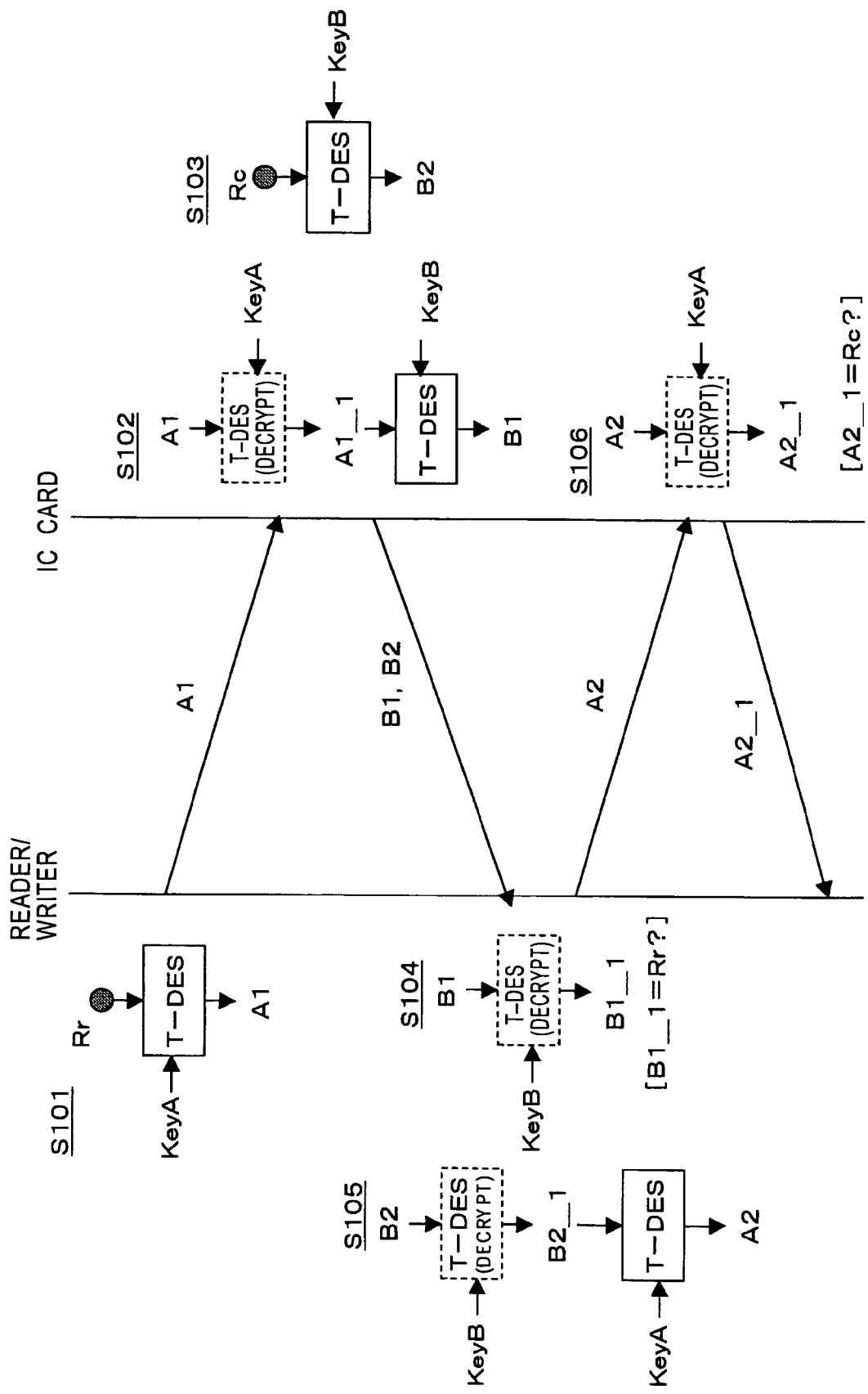
FIG. 5 illustrates a mutual authentication processing sequence of a common key method.

As a processing example in which this triple-DES encryption process is used, the sequence of the mutual authentication process performed among data communication devices via the Internet or between the IC card and the reader/writer is shown in FIG. 5.

In FIG. 5, on the right side, an IC card is shown, and on the left side, a reader/writer for performing data communication with the IC card is shown. Each device has a configuration in which an encryption processing module capable of performing the above-described triple-DES encryption process is stored so as to be capable of mutually performing data communication in a contact or non-contact manner.

The mutual authentication processing procedure by the DES common key encryption method shown in FIG. 5 will now be described. Initially, in step S101, by using a random number [Rr] as an input, the reader/writer performs a triple-DES encryption process (T-DES) by using a key [KeyA] which is commonly possessed by the reader/writer and the IC card in order to generate encrypted data [A1], and transmits the generated encrypted data [A1] to the IC card. In the manner described above, for the triple-DES encryption process, two different keys are used, and the above-mentioned key [KeyA] indicates a combination of two different keys used in the triple-DES encryption process.

In step S102, the IC card receiving encrypted data [A1] decrypts the encrypted data [A1] received using the key [KeyA] which is possessed commonly in accordance with the triple DES and obtains decrypted data [A1_1]. Also, in the decryption process, the triple-DES encryption process structure is used. That is, encrypted text is input to the triple-DES encryption processing section, and plain text is output. Furthermore, the IC card performs a triple-DES encryption process on the decrypted data [A1_1] by using the key [KeyB] which is commonly possessed by the reader/writer and the IC card and generates encrypted data [B1].

In addition, in step S103, the IC card generates a random number [Rc], and performs a triple-DES encryption process on the generated random number [Rc] by using a key [KeyB], generating encrypted data [B2]. The IC card transmits the generated encrypted data [B1] and encrypted data [B2] to the reader/writer.

When the encrypted data [B1] and the encrypted data [B2] are received from the IC card, in step S104, the reader/writer decrypts the encrypted data [B1] using the key [KeyB] and obtains decrypted data [B1_1]. Here, a check is made to determine whether or not the decrypted data [B1_1] matches the random number Rr which was previously generated. When they match, the reader/writer authenticates that the IC card is a device having a valid common key.

In addition, in step S105, the reader/writer decrypts the encrypted data [B2] using the key [KeyB] and obtains decrypted data [B2_1]. Furthermore, a triple-DES encryption process is performed on the decrypted data [B2_1] by using the key [KeyA] and obtains encrypted data [A2]. This encrypted data [A2] is transmitted to the IC card.

When the encrypted data [A2] is received from the reader/writer, in step S106, the IC card decrypts the encrypted data [A2] by using the key [KeyA], and obtains decrypted data [A2_1]. Here, a check is made to determine whether or not the decrypted data [A2_1] matches the random number Rc which was generated previously. When they match, the reader/writer authenticates that the IC card is a device having a valid common key. The IC card transmits the decrypted data [A2_1] to the reader/writer.

As a result of the above processing, it is certified that both the IC card and the reader/writer are valid devices having the same common key. When data communication is to be performed mutually, for example, data communication is performed in which the generated random number Rc (=A2_1), which serves as a session key, of the IC card is used as an encryption/decryption key for the communication data.

In the above-described common key authentication sequence, for example, if simple power analysis (SPA) for estimating secret information by observing consumption power during the encryption process, or differential power analysis (DPA) for estimating secret information by measuring consumption power in the encryption process on a large amount of data and by statistically analyzing the measured data is used for the processing sequence of the processing steps S102 and S103 of the IC card, there is a possibility that a key data sequence used for encryption processing may leak.

Figure 6A:
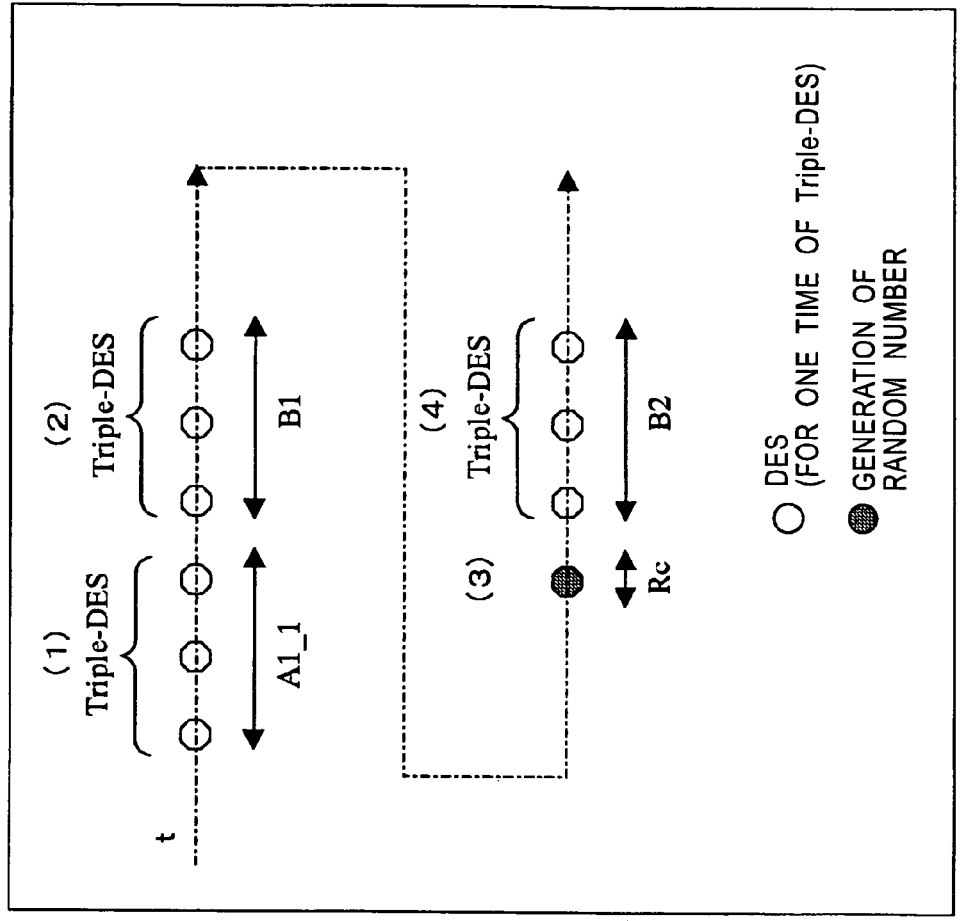
FIGS. 6A and 6B illustrate a detailed processing sequence on a IC card side in the mutual authentication processing sequence of the common key method.

A description will now be given, with reference to FIG. 6, of the sequence in a case where the processing sequence of the processing steps S102 and S103 of the IC card in the above-described common key authentication sequence is performed by the encryption processing module within the IC card. The processing sequence of the IC card is the processing shown in FIG. 6A.

More specifically, in steps S102 and S103:

(1) Decrypted data [A1_1] is obtained by the decryption process using the triple DES of the encrypted data [A1].

(2) Encrypted data [B1] is generated by the triple-DES encryption process of the decrypted data [A1_1].

(3) A generation process of the random number [Rc].

(4) By using the random number [Rc] as an input, a triple-DES encryption process is performed to generate encrypted data [B2].

Figure 6B:
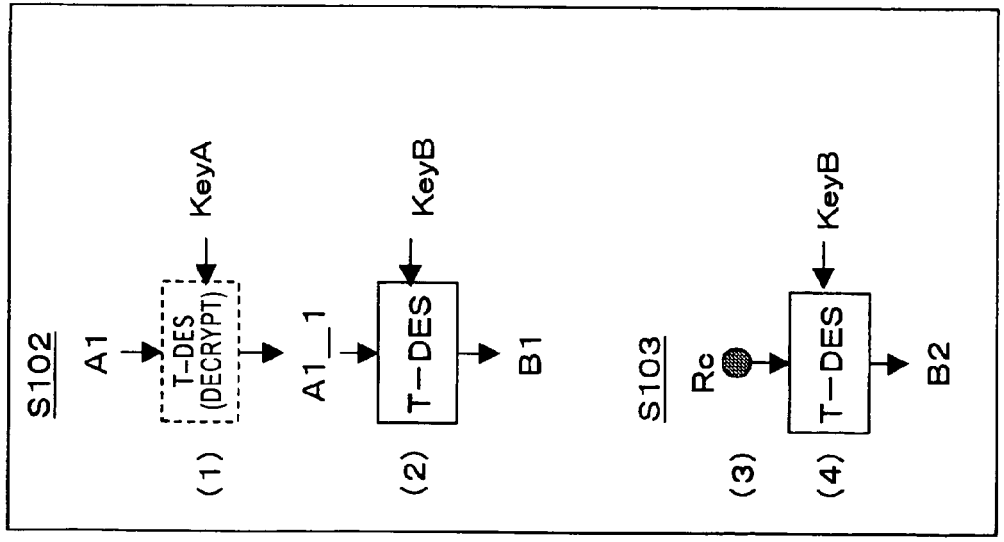

The above processes (1) to (4) are performed sequentially. More specifically, as shown in FIG. 6B, along the time axis t, (1) triple-DES, (2) triple-DES, (3) random-number generation, and (4) triple-DES are performed in sequence. The variation sequences of the power consumption of the IC card for performing these processes correspond to DES encryption processing sequences (1) to (4).

The DES encryption processing, as described above, repeatedly performs the F function of a plurality of stages in the round function section. There are cases in which, by analyzing power variations during the data conversion execution in which an S box as a non-linear conversion processing execution section which forms the F function is used, the analysis of the data conversion process becomes possible. Therefore, when the fact that the data sequence is performed as in FIG. 6B is understood, a conversion timing using the S box in each DES encryption process can be easily predicted, consumption power variations at that timing can be measured on the basis of various kinds of input data, and cryptanalysis by an unauthorized person is permitted.

The present invention provides an encryption processing apparatus and an encryption processing method having a configuration in which resistance to cryptanalysis is improved by mixing the regular processing sequences shown in FIG. 6.

A description will now be given, with reference to FIGS. 7A and 7B, of the structure of the encryption processing sequence of the present invention. In the encryption processing apparatus and method of the present invention, when compared to the conventional regular encryption processing sequence, the following processing is performed to mix the original encryption processing sequence in order to set the mixed encryption processing sequence.

(a) Expansion of the Random Number (Rc)

The single-DES encryption process is performed three times in order to perform a conversion process of the generated random number. Which random number should be used for an actual process can be set as desired. That is, an initialized random number may be used, and a value converted by the DES encryption process may be used. The reason why the single-DES encryption process is performed three times is that the occurrence of the random number is also caused to be recognized as the process of the triple DES when viewed from the analyzer, making difficult the distinction from other triple-DES processes.

(b) Addition of Dummies

A DES encryption process of n dummies is inserted at the end of the series of processes, so that a determination as to whether the data is meaningful in the analysis as the whole process is made difficult. The addition of the dummies is made at a multiple of 3 in a manner similar to the expansion of the random number. The reason for this is that each process is seen as a triple DES in a manner similar to the random number.

Figure 7B:
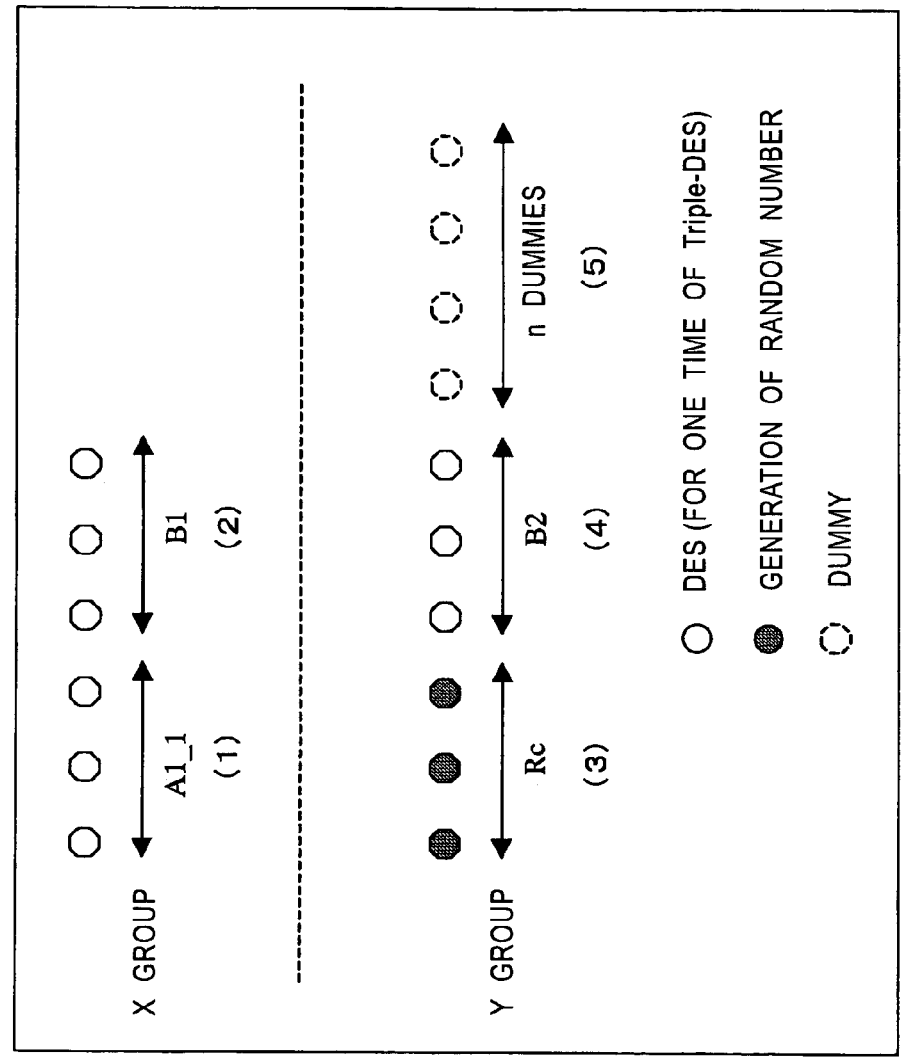
FIGS. 7A and 7B illustrate a process for setting a group of divisions in encryption processing of the present invention.
Figure 7A:
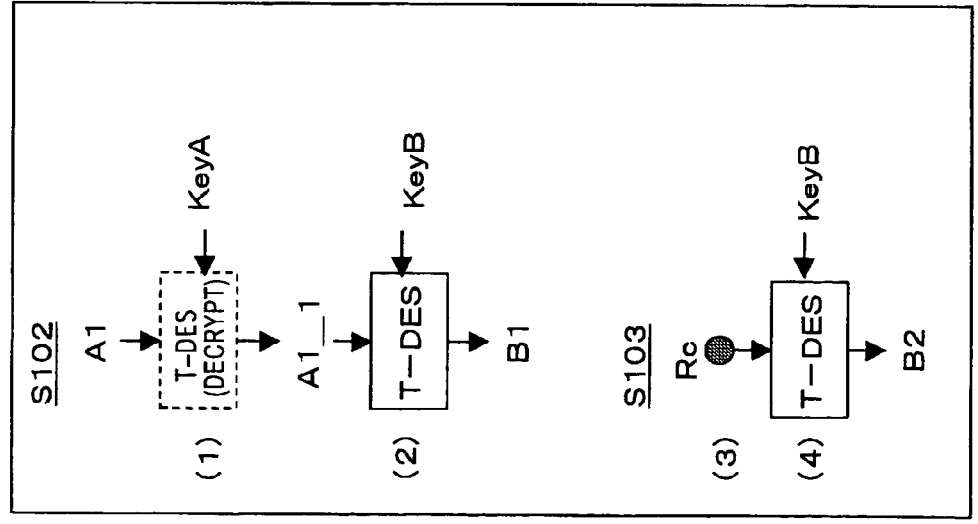

As shown in FIGS. 7A and 7B, the processing sequences of the processing steps S102 and S103 of the IC card in the common key authentication sequence are divided into two groups, that is, an X group, and a Y group.

The X group is formed of the following:

(1) Decrypted data [A1_1] is obtained by a decryption process by triple-DES of the encrypted data [A1].

(2) Encrypted data [B1] is generated by the triple-DES encryption process of the decrypted data [A1_1].

The Y group is formed of the following:

(3) A process for generating the random number [Rc].

(4) By using the random number [Rc] as an input, the triple-DES encryption process is performed to generate encrypted data [B2].

(5) A single-DES process for n dummies is performed.

In the manner described above, a single-DES process using dummies of (5) is added to the processes (1) to (4), (1) and (2) are grouped as an X group, and (3), (4), and (5) are grouped as a Y group, and thereafter, these processing sequences are mixed.

In the encryption processing apparatus of the present invention, when the original encryption processing sequence composed of one or more encryption processing units (for example, single DESs) is divided into a plurality of groups, a sequence group which can be executed independently among the original encryption processing sequences to be divided is determined, a division group setting process in which an independently executable sequence is a unit is performed, and a dummy is set in one of the setting groups as required. In the above-described example, each of the processes (1) and (2) is an independently executable sequence, and each of the processes (3) and (4) is another independently executable sequence.

A description will now be given, with reference to FIGS. 8A, 8B, and 8C, of the mixing process for generating a mixed encryption processing sequence. In FIGS. 8A, 8B, and 8C, single DESs which form the triple-DES executed in (1) the generation of [A1_1] of the X group are represented as X1, X2, and X3, and single DESs which form the triple-DES executed in (2) the generation of [B1] are represented as X4, X5, and X6.

Furthermore, single-DESs which form the triple-DES executed in (3) the generation of [Rc] of the Y group are represented as Y1, Y2, and Y3, single-DESs which form the triple-DES executed in (4) the generation of [B2] are represented as Y4, Y5, and Y6, and single-DESs executed in (5) n dummies are represented as Y7, Y8, . . . , Y6+n.

These DES encryption processes are performed with their sequences being replaced. However, for example, in the X group, X2 is performed after X1, and thereafter, X3, X4, X5, and X6 must be performed in this order. Therefore, the change of this processing sequence of X1 to X6 is not performed. Also, in the Y group, Y2 is performed after Y1, and thereafter, Y3, Y4, Y5, and Y6 must be performed in this order. Therefore, the change of this processing sequence of Y1 to Y6 is not performed.

In the encryption processing apparatus of the present invention, a mixed encryption processing sequence is set by dividing the original encryption processing sequence into a plurality of groups composed of one or more encryption processing units, and by performing a mixing of the processing sequences of the encryption processing units under the condition in which the processing sequence of the encryption processing units within each set group is fixed.

The number of combinations of the cases in which, under the above-described conditions, the processing sequences of the processing units X1 to X6 and Y1 to Y6+n of the single-DESs which form the X group and the Y group are mixed is calculated as described below.

First, as shown in FIG. 8A, there are a plurality of processing modes in which a Y group is inserted before and after X1 to X6 of the X group and in between them. For example, in a mode of a case in which a Y group, which is made a cluster, is inserted at the positions a1 to a7 of the X group shown in FIG. 8A, $_7C_1$ kinds, that is, 7 kinds. Furthermore, in a mode of a case in which a Y group is divided into two parts and these are inserted at the positions a1 to a7 of the X group shown in FIG. 8A, $_7C_2$ kinds, that is, 21 kinds. Hereafter, the Y group can be divided up to 6+n, and in that case, there are combinations of $_7C_{6+n}$.

In addition, as shown in FIG. 8B, also, for the setting mode of the division positions of the Y group to be inserted into the X group, a large number of combinations is possible according to the number of divisions. That is, the Y group, as shown in FIG. 8B, can be divided at one of b1 to b5+n. The number of division modes in a case where the number of divisions is 0, that is, in a case where the Y group, which is made a cluster, is inserted at one of the positions a1 to a7 of the X group, is $_{5+n}C_0$ kinds, that is, 1 kind. The number of division modes in a case where the number of divisions is 1, that is, in a case where the Y group is divided into two parts, is $_{5+n}C_1$ kinds. Hereafter, the number of divisions of the Y group can be set up to 5+n. The number of division modes in this case, that is, in a case where the Y group is divided into 5+n, becomes $_{5+n}C_{5+n}=1$ kind. In this manner, the number of combinations is determined according to the number of divisions of the Y group.

Furthermore, as shown in FIG. 8C, the number of combinations in which Y1 to Y6 are arranged as single-DES processes, contained in the real encryption processing sequence, that is, the original encryption processing sequence, within the (6+n) Y groups, is $_{6+n}C_6$ kinds.

As described above, when the number of combinations for each of FIGS. 8A, 8B, and 8C is taken into consideration, the total number of combinations is determined as the total number of the calculations shown in the equation below.

$$_7C_1 \times {}_{5+n}C_0 \times {}_{6+n}C_6$$

$$_7C_2 \times {}_{5+n}C_1 \times {}_{6+n}C_6$$

$$\ldots$$

$$_7C_{6+n} \times {}_{5+n}C_{5+n} \times {}_{6+n}C_6 \qquad \text{Equation 1}$$

The above equation will now be described with reference to FIG. 9. The part (A) in the equations shown in FIG. 9 is a calculation part corresponding to the number of combinations of FIG. 8A, and is also a calculation part of the number of combinations of the processing modes in which a Y group is inserted before and after X1 to X6 of the X group and in between them. The part (B) in the equations shown in FIG. 9 is a calculation part corresponding to the number of combinations of FIG. 8B, and is also a calculation part of the number of combinations of the division positions of the Y group to be inserted into the X group. The part (C) in the equations shown in FIG. 9 is a calculation part corresponding to the number of combinations of FIG. 8C, and is also a calculation part of the number of combinations in which Y1 to Y6 as single-DES processes required for a real encryption processing sequence are arranged within the (6+n) Y groups, that is, $_{6+n}C_6$.

For example, in the row of the topmost stage of FIG. 9, the number of combinations of a case in which the insertion position of the X group is set at 1 and the number of divisions of the Y group is set at 0, is calculated. In the next row, the number of combinations of a case in which the insertion position of the X group is set at 2, and the number of divisions of the Y group is set at 1, that is, the Y group is divided into two parts and these are inserted at one of the X groups, is calculated. In the row of the bottommost stage, the number of combinations of a case in which the insertion position of the X group is set at 7 (Max) and the number of divisions of the Y group is set at 5+n (Max) is calculated.

The sum of these calculated values of each row becomes the number of combinations in which the processing sequences of the processing units X1 to X6 and Y1 to Y6+n of the single-DESs which form the X group and the Y group are changed under the condition in which the processing sequences of X1 to X6 of the X group and Y1 to Y6 of the Y group are fixed.

Specific calculation examples will now be described with reference to FIGS. 10A and 10B. FIG. 10A shows a case in which the total number of combinations is calculated when the setting of the number of added dummies: n=0 is made in the X group X1 to X6 and the Y group Y1 to Y6, and the total number of the combinations is 942.

FIG. 10B shows a case in which the total number of combinations is calculated when the setting of the number of added dummies: n=3 is made in X1 to X6 of the X group and Y1 to Y6 of the Y group, and the total number of the combinations is 420420. Furthermore, by increasing the number of dummies, the number of combinations increases in an accelerated manner.

In the encryption processing apparatus and the encryption processing method of the present invention, as described above, a plurality of original encryption processing sequences to be performed are divided into a plurality of groups, the encryption processing units (for example, single-DESs) in those division groups are mixed under predetermined conditions in which, for example, the sequence within each group is fixed, the mixed encryption processing sequence is set, and the encryption process is performed in accordance with the set mixed encryption processing sequence.

Therefore, the consumption power corresponds to the mixed encryption processing sequence and does not correspond to the above-mentioned regular sequence. As a result, it is very difficult to estimate which portion of the DES encryption process within the process performed in processing steps S102 and S103 on the IC card side shown in FIG. 5 is being executed by externally monitoring the consumption power.

As is also clear from the specific values of FIGS. 10A and 10B, even when no dummy is used, there are 942 kinds of setting modes of the processing sequence. If the sequence is set when the process starts and the process is performed, the sequence differs for each process, making the encryption process analysis extremely difficult by externally monitoring the power. Furthermore, as a result of adding a process using a dummy, as shown in FIG. 10, the number of settable sequences is markedly increased, and the probability that the same sequence is repeated becomes extremely low. Therefore, it becomes possible to considerably reduce the possibility of the encryption analysis by externally monitoring the power.

In the above-described embodiment, although a description is given by using, as an example, the processing steps S102 and S103 on the IC card side in the authentication sequence shown in FIG. 5, the above-described sequence mixing process can also be applied in the same way to other processes, for example, processing steps S104 and S105 of the reader/writer in FIG. 5. For example, the processing sequence can be set by a mixing process in which the process of step S104 is set as an X group, the process of step S105 is set as a Y group, a single-DES process by a dummy process is set in at least one of the groups as necessary, and the sequence of each encryption processing unit (a single-DES) is replaced similarly to the foregoing.

Furthermore, in the above-described embodiment, although a structure example for performing a DES encryption process is described, the encryption process can be made difficult by the mixing of the processing sequence in a manner similar to the foregoing also in a configuration in which another encryption processing algorithm, not being limited to DES, is performed.

In various encryption processing algorithms, for example, in algorithms having encryption processing units similarly to single-DESs, a mixing process is performed in which the sequence of individual processing units of a plurality of groups is changed under the condition in which the encryption processing unit is divided into a plurality of independently executable groups, a dummy processing unit is added as necessary, and a sequence in which the output of the result is possible is maintained. By performing the encryption process in accordance with the mixed processing sequence, which is set in this manner, external power analysis is made difficult.

Furthermore, although in the above-described embodiment, a processing example is described in which the encryption processing sequence is divided into two groups, that is, the X group and the Y group, when three or more encryption processing sequences which can be performed independently of each other exist in the original encryption processing sequence to be performed, the encryption process can be performed by dividing the encryption processing sequence into three or more groups, by setting a dummy in at least one of the groups as necessary, by mixing the encryption processing units under the condition in which the processing sequence within each division group is maintained, and by setting the mixed processing sequence.

Figure 11:
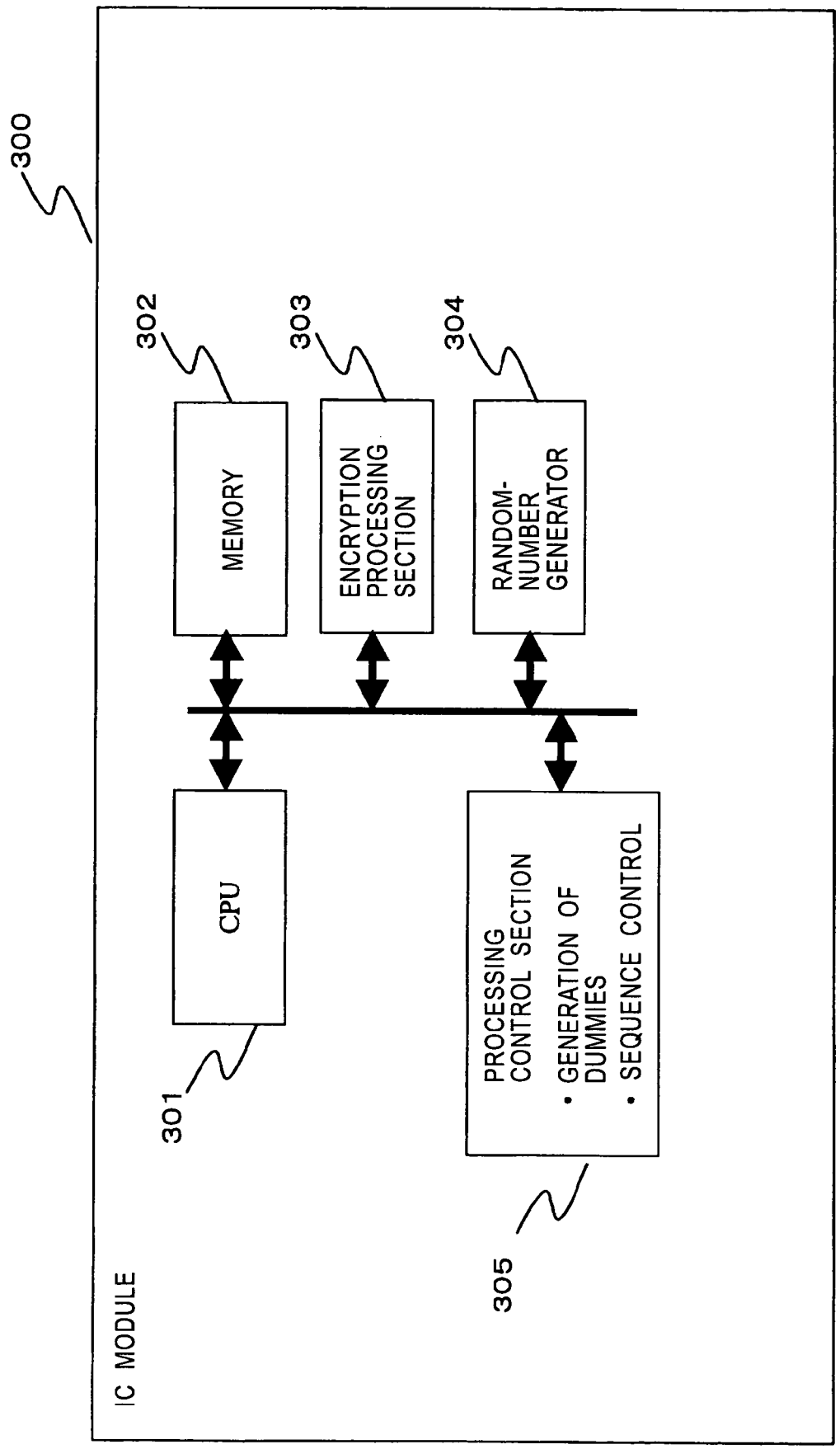
FIG. 11 is a block diagram illustrating an example of the configuration of an IC module for performing an encryption process of the present invention.

FIG. 11 shows the setting of the above-described encryption processing sequence, and an example of the configuration of an IC module 300 serving as a device for performing the set encryption processing sequence. The above-described processing can be performed in, for example, a PC, an IC card, a reader/writer, and other various information processing devices. The IC module 300 shown in FIG. 11 can be configured as one of these various devices.

A CPU (Central processing Unit) 301 shown in FIG. 11 is a processor for starting and ending an encryption process, controlling transmission and reception of data, controlling data transfer among various component sections, and executing other various programs. A memory 302 is formed of a ROM (Read-Only Memory) in which programs to be executed by the CPU 301 and/or fixed data as computation parameters are stored, a RAM (Random Access Memory) used as an area for storing programs executed in the process of the CPU 301 and parameters which vary appropriately in the program process and used as a work area. Furthermore, the memory 302 can be used as an area for storing key data required for an encryption process. The area for storing data is preferably formed as an anti-tampering memory.

An encryption processing section 303 performs an encryption process and a decryption process in accordance with, for example, the above-described triple-DES. Here, although an example in which encryption processing means are used as individual modules are described, the construction may be formed in such a way that such independent encryption processing modules are not provided and, for example, an encryption process program is stored in a ROM and the CPU 301 reads the program stored in the ROM and executes it.

A random-number generator 304 performs a process for generating a random number necessary for an encryption process. When the generated random number is converted by, for example, a DES encryption process, the generated random number is input to the encryption processing section 303, whereby an encryption process is performed.

A process control section 305 performs a process for setting the processing sequences in the above-described processing, that is, a process for setting a plurality of groups, such as an X group and a Y group; a process for setting dummies with respect to the set group of processes; and a process of setting an input value on a dummy encryption process when a dummy encryption process (for example, a single-DES) is performed.

Here, in order to facilitate the understanding, the process control section 305 is described independently as an element for performing characterizing processes of the present invention. Alternatively, the above-described process of the process control section 305 may be formed so as to be performed at the CPU 301 or the control section within the encryption processing section 303, and it is not indispensable that the above-described process control section is formed independently.

A description will now be given, with reference to the flowcharts in FIGS. 12 and 13, of the procedure of the sequence setting of an encryption process and the procedure of performing the encryption process in the encryption processing apparatus of the present invention.

The process for each step shown in the flowchart of FIG. 12 will now be described. First, a device for performing an encryption process, for example, an IC card, a reader/writer, or a PC, divides the original encryption processing sequence into a plurality of groups in step S301. This division into a plurality of groups corresponds to the division into the X group and the Y group in the above-described embodiment. The requirement for the division into groups is that the encryption process of each group is set as an independently executable sequence. More specifically, sequences which can be executed independently of each other can be set as individual groups. The sequences of steps S104 and S105 of the reader/writer can also be set as individual groups like the encryption processing sequence of step S102 and the encryption processing sequence of step S103 in the IC card shown in FIG. 5. If there are three or more independent sequences, division into three or more groups is possible.

Figure 12:
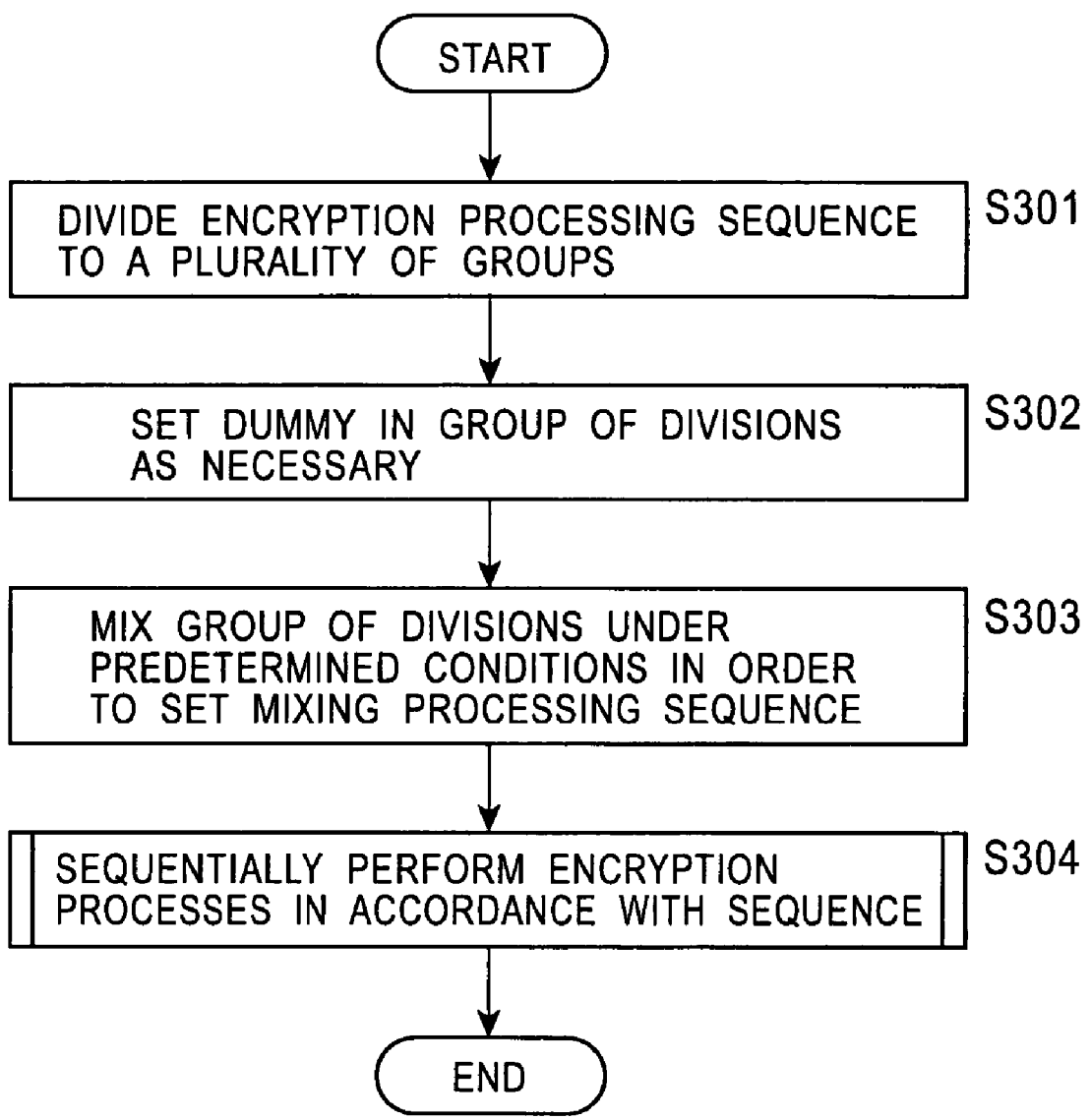
FIG. 12 is a flowchart illustrating an encryption processing procedure of the present invention.

When a division into a plurality of groups is performed in step S301 in the flowchart of FIG. 12, in step S302, a dummy is set in one of the groups of divisions. This is a process of setting n dummies of the Y group, shown in FIGS. 7 and 8. The setting of dummies may be performed as desired. Even when dummies are not used, as described above with reference to FIG. 10, there are cases in which a sufficient sequence mixing is possible. When a sufficient mixing is possible in this manner, the construction may be formed in such a way that dummies are not added.

In step S303, by mixing a group of divisions under predetermined conditions, an encryption processing sequence is set. The predetermined conditions are conditions in which, for example, a mixing of the processing sequence of encryption processing units in each individual group (for example, single-DESs) is not performed.

The mixed encryption processing sequence to be set is one sequence selected from 420420 kinds in a case where a number of added dummies: n=3 is set in the X group X1 to X6 and the Y group Y1 to Y6 in the example of FIG. 10B. This selection of the sequence is randomly made by, for example, the control section of the encryption processing apparatus.

When the selection of the mixed encryption processing sequence to be executed is completed, in step S304, an encryption process is performed in accordance with the set sequence. The details of the execution of the encryption process will now be described with reference to the flowchart in FIG. 13.

Figure 13:
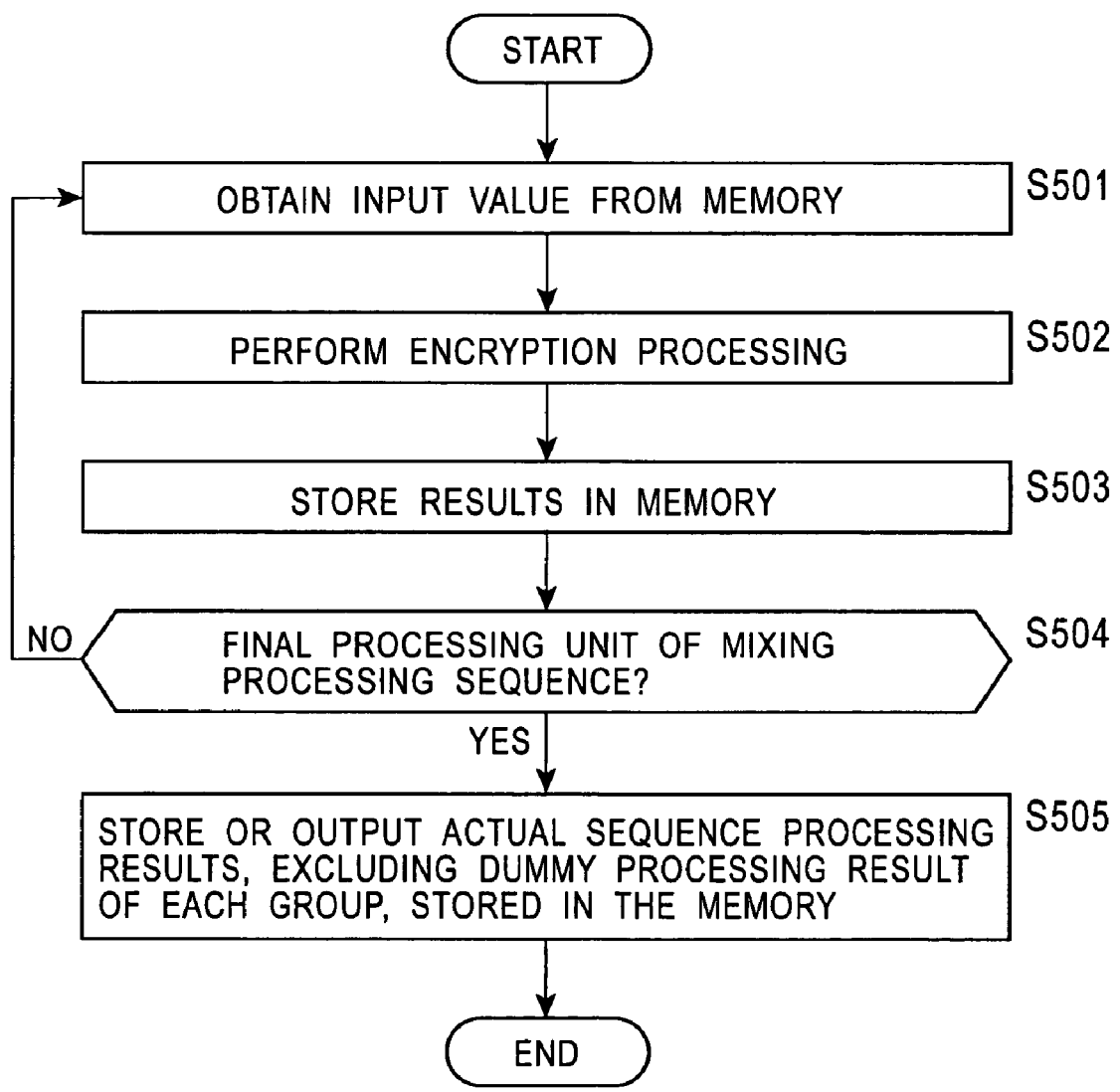
FIG. 13 is a flowchart illustrating the encryption processing procedure of the present invention.

The flowchart in FIG. 13 shows each processing unit which forms the mixed encryption processing sequence. That is, in the above-described embodiment, the flowchart shows the processing procedure in the process of a single-DES corresponding to one circle shown in FIGS. 7 and 8. In step S501, a value to be input to a processing unit (for example, a single-DES) is obtained from the memory, and in step S502, an encryption process (for example, a single-DES) based on the input value is performed.

In the case of a process of inputting the result of the previous stage, for the value to be obtained from the memory, the processing result of the previous stage is obtained from the memory. For example, in FIG. 8, in the process for X2 of the X group, it is necessary to input the processing result of X1. In this case, the output result of the previous stage is obtained from the memory, and this is assumed to be an input value.

When the process of the encryption processing unit is performed in step S502, in step S503, the result is stored in the memory. When the result is stored, it is stored in a state in which a determination can be made as to which processing unit the data is obtained from. For example, in FIG. 8, when the process of X2 of the X group is performed, the processing result is stored in such a manner that the fact that it is the processing result of X2 can be determined. As a result of the above, when the process of X3 is to be performed, the input value of X3 can be obtained from the memory without errors.

It is determined in step S504 whether or not the executed processing unit is the final processing unit of the mixed encryption processing sequence. In the case of "No", the process returns to step S501, where the sequence in which the input value is retrieved from the memory and the encryption process is performed is repeated.

When it is determined in step S504 that the executed processing unit is the final processing unit of the mixed encryption processing sequence, the process proceeds to step S505, where the final processing result of the original encryption processing sequence of each group, which is necessary actually, excluding the processing result based on the dummy, from among the values stored in the memory, is stored in the memory or output as necessary. In the example shown in FIG. 7 or 8, the processing result of the processing unit X6 in the X group, and the processing result of the processing unit Y6 in the Y group are data to be stored in the memory or to be output. In the example shown in FIG. 5, these are values corresponding to the result [B1] of step S102 and the result [B2] of step S103.

As a result of dividing the original encryption processing sequence into a plurality of groups, setting a dummy as necessary, and performing the encryption process after the mixed encryption processing sequence is set in the manner described above, a regular processing sequence corresponding to the original encryption processing sequence is not performed, and thus the difficulty of encryption process analysis based on power analysis can be increased.

In the above-described embodiment, a description is given on the assumption that the original encryption processing sequence is divided into a plurality of groups. When a plurality of sequences which can be executed independently do not exist, the construction may be formed in such a way a division into a group of divisions is not performed, only the addition of dummies is performed, and a mixing based on the added dummies and the processing units of the original encryption processing sequence is performed.

More specifically, the original encryption processing sequence may be divided into encryption processing units, dummy encryption processing units for performing processes corresponding to the encryption processing units may be added, a mixed encryption processing sequence is set by performing a mixing of the original encryption processing units contained in the original encryption processing sequence and the dummy encryption processing units, and the encryption process may be performed in accordance with the set mixed encryption processing sequence. In this case, for example, when the encryption processing unit contained in the original encryption processing sequence is a single-DES encryption process, the dummy encryption processing unit is also set as a single-DES encryption process.

Figure 14:
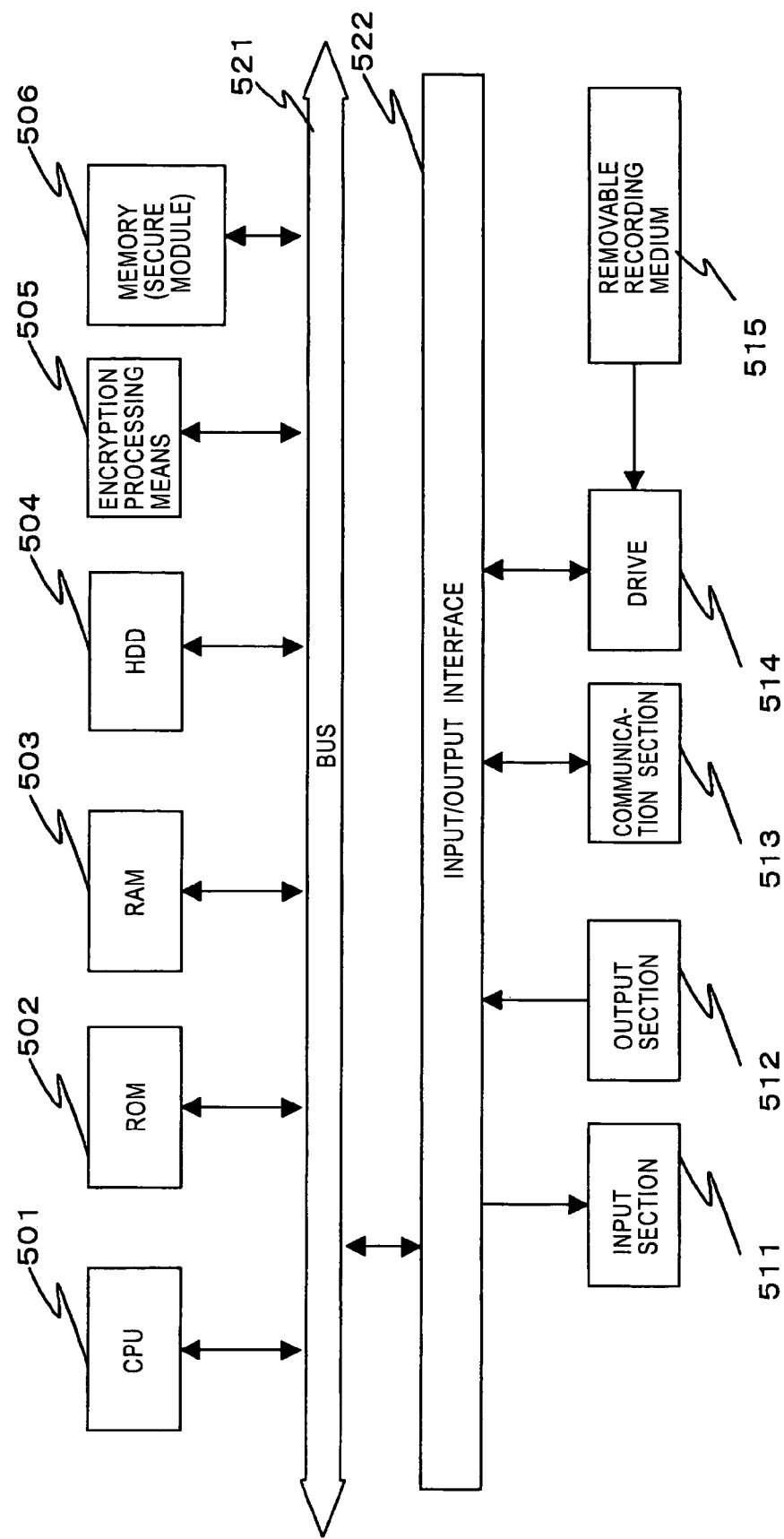
FIG. 14 shows an example of the configuration of an information processing apparatus for performing an encryption process of the present invention.

A description will now be given, with reference to FIG. 14, of an example of the configuration of a device, such as a PC having an encryption processing IC module, a portable device, a reader/writer, or an IC card. In FIG. 11, the configuration of only the encryption processing IC module is shown as a minimum component for performing the above-described processing. With reference to FIG. 14, a description is given of an overall configuration of an information processing apparatus including a communication section through which data input/output is possible, a storage section, an input section, and an output section, and including a configuration capable of setting and executing the above-described encryption processing sequence and capable of performing data input/output.

The series of processes described in the above-described embodiment can be performed by a combination of hardware and software. That is, the construction may be formed in such a way that the series of processes is performed by allowing a general-purpose computer or a microcomputer to execute a program. When the series of processes is to be performed by software, the program which forms the software is installed into, for example, a general-purpose computer or a one-chip microcomputer. FIG. 14 shows an example of the configuration of an embodiment of a computer capable of installing and executing a program for performing the above-described series of processes.

The example of the system configuration shown in FIG. 14 is only an example, and the system for performing the processes of the present invention is not necessarily required to include all the functions shown herein. A CPU (Central processing units) 501 shown in FIG. 14 is a processor for executing a program in accordance with the above-described algorithm, other various kinds of application programs, and the OS (Operating System). In this example, the process of the process control section shown in FIG. 11 is also performed under the control of the CPU 501.

A ROM (Read-Only Memory) 502 has stored therein programs executed by the CPU 501 and/or fixed data as computation parameters. A RAM (Random Access Memory) 503 is used as an area for storing a program executed in the process of the CPU 501 and parameters which vary as appropriate in the program process, and used as a work area therefor.

A HDD 504 controls a hard disk so as to perform a process of storing various kinds of data and programs in the hard disk, and performs a process of reading them. An encryption process means 505 performs a data encryption process, a data decryption process, and a random-number generation process. Here, although an example in which the encryption process means is used as an individual module is described, such independent encryption processing module may not be provided, and, for example, an encryption processing program may be stored in the ROM 502, so that the CPU 501 may read the program stored in the ROM and execute the program. A memory (secure module) 506 is formed as, for example, an anti-tampering memory, and can be used as an area for storing key data necessary for an encryption process. These pieces of data can also be stored in another memory area and storage medium.

A bus 521 is formed of a PCI (Peripheral Component Internet/Interface) bus, etc., so that data transfer with each input device via each module and an input/output interface 122 is made possible.

An input section 511 includes, for example, a keyboard, a pointing device, and other data input means, and inputs various kinds of data or commands to the CPU 501. An output section 512 is, for example, a CRT, a liquid-crystal display, or the like, and displays various kinds of information in the form of text, images, etc.

A communication section 513 performs a communication process with a connected entity of the system, for example, a communication entity (for example, a reader/writer) for encrypted data, and performs, under the control of the CPU 501, a process of transmitting data supplied from each storage section, data processed by the CPU 501, encrypted data, etc., and a process of receiving data from another entity.

A drive 514 performs recording into and reproduction from a removable recording medium 515, such as a flexible disk, a CD-ROM (Compact Disc Read-Only Memory), an MO (Magneto optical) disk, a DVD (Digital Versatile Disc), a magnetic disk, or a semiconductor memory. The drive 514 reproduces a program or data from each removable recording medium 515 and stores a program or data in the removable recording medium 515.

When the program or data recorded in each storage medium is read, and is executed or processed in the CPU 501, the read program or data is supplied to, for example, the connected RAM 503 via an interface 522 and the bus 521.

The program for performing a process described with reference to the above-described flowcharts is stored, for example, in the ROM 502 and is processed by the CPU 501, or is stored in a hard disk and is executed by the CPU 501 after the program is read from the hard disk.

The series of processes described in the specification can be performed by hardware, software, or the combined configuration of them. When a process is to be performed by software, a program in which a processing sequence is recorded can be installed into a memory inside a computer incorporated into dedicated hardware, whereby the program is executed, or a program can be installed into a general-purpose computer capable of performing various processing, whereby the program is executed.

For example, a program can be recorded in advance in a hard disk and a ROM (Read Only Memory) as a recording medium. Alternatively, a program can be temporarily or permanently stored (recorded) in a removable recording medium, such as a flexible disk, a CD-ROM (Compact Disc Read-Only Memory), an MO (Magneto optical) disk, a DVD (Digital Versatile Disc), a magnetic disk, or a semiconductor memory. Such a removable recording medium can be provided as so-called packaged software.

In addition to being installed into a computer from the removable recording medium such as that described above, programs may be transferred in a wireless manner from a download site or may be transferred by wire to a computer via a network, such as a LAN (Local Area Network) or the Internet, and it is possible for the computer to receive the programs which are transferred in such a manner and to install the programs into the hard disk contained therein.

Various processes described in the specification may be executed not only chronologically according to the written orders, but also may be executed concurrently or individually according to the processing performance of the apparatus which performs a process or as necessary.

What is claimed is:

1. An encryption processing apparatus configured to perform a data encryption process, said encryption processing apparatus comprising:
   a processor configured to provide:
   a control section configured to set a mixed encryption processing sequence by dividing an original encryption processing sequence into a plurality of groups, each group being composed of a plurality of encryption processing units, each encryption processing unit being a defined process, each group being a separate and independent encryption process for encrypting an input data, where a first input data to be encrypted for a first group of the groups is different relative to a second input data to be encrypted for a second group of the groups, and the first input data to be encrypted for the first group is generated independently relative to the second input data to be encrypted for the second group, said control section mixing processing sequences of encryption processing units of the plurality of groups with each other by executing performance of at least one encryption processing unit from the first group at a time between executing performance of encryption processing units from the second group and under a condition in which a processing sequence of the encryption processing units within each of the plurality of groups is fixed;
   an encryption processing section configured to perform an encryption process in accordance with the mixed encryption processing sequence set by said control section; and
   a transmitting unit configured to transmit each of encrypted output data generated independently by the first group and the second group to an external device,
   wherein each group includes a triple-DES encryption process and said control section is configured to set a dummy single-DES process as a dummy encryption process that is unnecessary for an encryption processing sequence in at least one of said groups, and set the number of dummy single-DES processes to be a multiple of 3, and
   said control section is configured to set a dummy encryption processing unit that performs the dummy encryption process in at least one of the groups, and set one mixed encryption processing sequence by mixing the encryption processing units of a plurality of groups containing the dummy encryption processing unit.

2. The encryption processing apparatus according to claim 1, wherein said control section is configured to determine a group of sequences, which can be performed independently of each other, within the original encryption processing sequence to be divided in a process of division into the plurality of groups, and perform a process for setting a group of divisions in which each of the sequences in the group of sequences can be performed independently as a unit.

3. The encryption processing apparatus according to claim 1, wherein said encryption processing unit is a single-DES encryption process, and
   wherein said control section is configured to set the mixed encryption processing sequence by dividing the original encryption processing sequence containing one or more single-DES encryption processes into a plurality of groups composed of one or more single-DES encryption processes and by mixing the single-DES encryption processing units contained in each group by mutual replacement of the single-DES encryption processing units of each set group under the condition in which the processing sequence within each set group is fixed.

4. The encryption processing apparatus according to claim 1, wherein said control section is configured to perform a process for dividing the encryption processing sequence into a plurality of groups composed of one or more encryption processing units by using a single-DES encryption process which forms a triple-DES encryption process as an encryption processing unit.

5. The encryption processing apparatus according to claim 1, wherein the original encryption processing sequence to be mixed is an encryption processing sequence including a random-number generation process, and
   said control section is configured to form a random-number generation process as a process including a conversion process by three single-DES processes, and sets the three single-DES processes as a random-number generation process in one of the groups of divisions.

6. The encryption processing apparatus according to claim 1, wherein said encryption processing apparatus has a memory for storing processing results of the encryption processing units which form the mixed encryption processing sequence set by said control section, and said control section is configured to store the processing results in said memory to identify which encryption processing unit the processing results are obtained from.

7. An encryption processing apparatus configured to perform a data encryption process, said encryption processing apparatus comprising:

a processor configured to provide:

a control section configured to set a mixed encryption processing sequence by dividing an original encryption processing sequence into a plurality of groups, each group being composed of a plurality of encryption processing units, each encryption processing unit being a defined process, each group being a separate and independent encryption process for encrypting an input data, where a first input data to be encrypted for a first group of the groups is different relative to a second input data to be encrypted for a second one of the groups and the first input data to be encrypted for the first group is generated independently relative to the second input data to be encrypted for the second group, said control section adding dummy encryption processing units as encryption processing units to at least one of the groups that performs dummy encryption processes that are unnecessary for the original encryption processing sequence, and said control section performing a mixing of processing sequences of the encryption processing units of the plurality of groups with each other by executing performance of at least one encryption processing unit from the first group at a time between executing performance of encryption processing units from the second group;

an encryption processing section configured to perform an encryption process in accordance with the mixed encryption processing sequence set by said control section; and a transmitting unit configured to transmit each of encrypted output data generated independently by the first group and the second group to an external device, wherein an encryption processing unit contained in said original encryption processing sequence is a single-DES encryption process, said control section is configured to set said dummy encryption processes as single-DES encryption processes and wherein said control section is configured to set the number of dummy encryption processes to a multiple of 3.

8. An encryption processing method, implemented on an encryption processing apparatus, for performing a data encryption process, said encryption processing method comprising:

dividing, at the encryption processing apparatus, an original encryption processing sequence into a plurality of groups, each group being composed of a plurality of encryption processing units, each encryption processing unit being a defined process, each group being a separate and independent encryption process for encrypting an input data, where a first input data to be encrypted for a first group of the groups is different relative to a second input data to be encrypted for a second group of the groups, and the first input data to be encrypted for the first group is generated independently relative to the second input data to be encrypted for the second group;

setting, at the encryption processing apparatus, a mixed encryption processing sequence by mixing processing sequences of encryption processing units of the plurality of groups with each other by executing performance of at least one encryption processing unit from the first group at a time between executing performance of encryption processing units from another the second group and under a condition in which a processing sequence of the encryption processing units, set in said dividing, within each group is fixed; and performing, at the encryption processing apparatus, an encryption process in accordance with the mixed encryption processing sequence set in said setting; and transmitting, from the encryption processing apparatus, each of encrypted output data generated independently by the first group and the second group to an external device, wherein each group includes a triple-DES encryption process and said dividing includes setting a dummy single-DES process as a dummy encryption process that is unnecessary for the original encryption processing sequence in at least one of said groups, and setting the number of single-DES processes of dummies to be set to a multiple of 3, said method further comprising:

setting a dummy encryption processing unit that performs the dummy encryption process in at least one of the groups, and setting the mixed encryption processing sequence by mixing the encryption processing units of a plurality of groups containing said dummy encryption processing unit.

9. The encryption processing method according to claim 8, wherein said dividing determines a group of sequences, which can be performed independently of each other, within the original encryption processing sequence to be divided in a process of division into the plurality of groups, and performs a process for setting a group of divisions in which each of the sequences in the group of sequences can be performed independently as a unit.

10. The encryption processing method according to claim 8, wherein each of said encryption processing units is a single-DES encryption process, said dividing divides the original encryption processing sequence containing one or more single-DES encryption processes into a plurality of groups composed of one or more single-DES encryption processes, and said setting sets one mixed encryption processing sequence by mixing the single-DES encryption processing units contained in each group by mutual replacement of the single-DES encryption processing units of each set group under the condition in which the processing sequence within each set group is fixed.

11. The encryption processing method according to claim 8, wherein said dividing performs a process for dividing the encryption processing sequence into a plurality of groups composed of one or more encryption processing units with a single-DES encryption process which forms a triple-DES encryption process being an encryption processing unit.

12. The encryption processing method according to claim 8, wherein the original encryption processing sequence to be mixed is an encryption processing sequence including a random-number generation process, and said encryption processing method further comprises forming a random-number generation process as a process including a conversion process by three single-DES processes and setting the three single-DES processes as a random-number generation process in one of the groups.

13. The encryption processing method according to claim 8, further comprising:
storing processing results in a memory for storing processing results of the encryption processing units which form the mixed encryption processing sequence to identify which encryption processing unit the processing results are obtained from.

14. An encryption processing method, implemented on an encryption processing apparatus, for performing a data encryption process, said encryption processing method comprising:
dividing, at the encryption processing apparatus, an original encryption processing sequence, into a plurality of groups, each group being composed of a plurality of encryption processing units, each encryption processing unit being a defined process, each group being a separate and independent encryption process for encrypting an input data, where a first input data to be encrypted for a first group of the groups is different relative to a second input data to be encrypted for a second group of the groups, and the first input data to be encrypted for the first group is generated independently relative to the second input data to be encrypted for the second group,
setting, at the encryption processing apparatus, a mixed encryption processing sequence by adding dummy encryption processing units as encryption processing units to at least one of the groups, the dummy encryption processing units performing dummy encryption processes that are unnecessary for the original processing sequence and by mixing processing sequences of the encryption processing units of the plurality of groups with each other by executing performance of at least one encryption processing unit from the first group at a time between executing performance of encryption processing units from the second group;
performing, at the encryption processing apparatus, an encryption process in accordance with said mixed encryption processing sequence; and
transmitting, from the encryption processing apparatus, each of encrypted output data generated independently by the first group and the second group to an external device,
wherein an encryption processing unit contained in said original encryption processing sequence is a single-DES encryption process,
said setting sets said dummy encryption processes as a single-DES encryption process, and
wherein said dividing includes setting the number of dummy encryption processes to a multiple of 3.

15. A non-transitory computer readable storage medium encoded with computer executable instructions, which when executed by a computer, cause the computer to perform a method comprising:
dividing an original encryption processing sequence into a plurality of groups, each group being composed of a plurality of encryption processing units, each encryption processing unit being a defined process, each group being a separate and independent encryption process for encrypting an input data, where a first input data to be encrypted for a first group of the groups is different relative to a second input data to be encrypted for a second group of the groups, and the first input data to be encrypted for the first group is generated independently relative to the second input data to be encrypted for the second group;
setting a mixed encryption processing sequence by mixing processing sequences of encryption processing units of the plurality of groups with each other by executing performance of at least one encryption processing unit from the first group at a time between executing performance of encryption processing units from the second group and under a condition in which a processing sequence of the encryption processing units, set in said dividing, within each group is fixed;
performing an encryption process in accordance with the mixed encryption processing sequence set in said setting; and
transmitting each of encrypted output data generated independently by the first group and the second group to an external device,
wherein each group includes a triple-DES encryption process and said dividing includes setting a dummy single-DES process as a dummy encryption process that is unnecessary for the original encryption processing sequence in at least one of said groups, and setting the number of single-DES processes of dummies to be set to a multiple of 3, said method further comprising:
setting a dummy encryption processing unit that performs the dummy encryption process in at least one of the groups, and
setting the mixed encryption processing sequence by mixing the encryption processing units of a plurality of groups containing said dummy encryption processing unit.

16. A non-transitory computer readable storage medium encoded with computer executable instructions, which when executed by a computer, cause the computer to perform a method comprising:
dividing an original encryption processing sequence, into a plurality of groups which each include a plurality of encryption processing units, each encryption processing unit being a defined process, each group being a separate and independent encryption process for encrypting an input data, where a first input data to be encrypted for a first group of the groups is different relative to a second input data to be encrypted for a second group of the groups, and the first input data to be encrypted for the first group is generated independently relative to the second input data to be encrypted for the second group;
setting a mixed encryption processing sequence by adding dummy encryption processing units as encryption processing units to at least one of the groups, the dummy encryption processing units performing dummy encryption processes that are unnecessary for the original processing sequence and by mixing processing sequences of the encryption processing units of the plurality of groups with each other by executing performance of at least one encryption processing unit from the first group at a time between executing performance of encryption processing units from the second group; and
performing an encryption process in accordance with said mixed encryption processing sequence; and
transmitting each of encrypted output data generated independently by the first group and the second group to an external device,
wherein an encryption processing unit contained in said original encryption processing sequence is a single-DES encryption process, said setting sets said dummy encryption processes as a single-DES encryption process, and wherein said dividing includes setting the number of dummy encryption processes to a multiple of 3.

17. The encryption processing apparatus according to claim 1, wherein the first input data to be encrypted for the first group is received from the external device, the second input data to be encrypted for the second group is a random number generated at the encryption processing apparatus, and each of encrypted output data generated independently by the first group and the second group that is sent to the external device is used to verify that the encryption processing apparatus and the external device share a valid common key.

* * * * *